United States Patent
Iino et al.

(10) Patent No.: US 10,109,870 B2
(45) Date of Patent: Oct. 23, 2018

(54) CARBON MEMBER, CARBON MEMBER MANUFACTURING METHOD, REDOX FLOW BATTERY AND FUEL CELL

(71) Applicant: SHOWA DENKO K.K., Tokyo (JP)

(72) Inventors: Tadashi Iino, Kawasaki (JP); Shunya Suzuki, Kawasaki (JP)

(73) Assignee: SHOWA DENKO K.K., Tokyo (JP)

( * ) Notice: Subject to any disclaimer, the term of this patent is extended or adjusted under 35 U.S.C. 154(b) by 576 days.

(21) Appl. No.: 14/783,331

(22) PCT Filed: Apr. 4, 2014

(86) PCT No.: PCT/JP2014/059961
§ 371 (c)(1),
(2) Date: Oct. 8, 2015

(87) PCT Pub. No.: WO2014/168081
PCT Pub. Date: Oct. 16, 2014

(65) Prior Publication Data
US 2016/0064746 A1    Mar. 3, 2016

(30) Foreign Application Priority Data

Apr. 11, 2013  (JP) ................. 2013-082949

(51) Int. Cl.
*H01M 8/02*    (2016.01)
*H01M 8/18*    (2006.01)
(Continued)

(52) U.S. Cl.
CPC ........... *H01M 8/0297* (2013.01); *H01M 4/96* (2013.01); *H01M 8/0213* (2013.01);
(Continued)

(58) Field of Classification Search
CPC ........ H01M 4/88; H01M 4/96; H01M 8/0213; H01M 8/0221; H01M 8/0228;
(Continued)

(56) References Cited

U.S. PATENT DOCUMENTS

| 2006/0054269 A1 | 3/2006 | Nishi et al. |
| 2011/0180762 A1 | 7/2011 | Sasaki et al. |
| 2012/0214375 A1 | 8/2012 | Kitano et al. |

FOREIGN PATENT DOCUMENTS

| EP | 1890353 A1 | 2/2008 |
| EP | 2717369 A1 | 4/2014 |

(Continued)

OTHER PUBLICATIONS

Communication dated May 3, 2016, issued by the Korean Intellectual Property Office in corresponding Korean Application No. 10-2015-7027233.

(Continued)

*Primary Examiner* — Stewart A Fraser
*Assistant Examiner* — Rachel L Zhang
(74) *Attorney, Agent, or Firm* — Sughrue Mion, PLLC

(57) ABSTRACT

A carbon member for use as a battery member of a redox flow battery or a fuel cell, obtained by welding, into a single integrated body: a first layer including a first resin composition containing a polyolefin-based resin and having a melt flow rate of 0.01 to 10 g/10 min, and a first carbonaceous material; a second layer including a second resin composition containing a polyolefin-based resin, having a melt flow rate of 5 to 1,000 g/10 min that is greater than that of the first resin composition, and having a melting point that is 80° C. or higher, but is at least 10° C. lower than that of the first resin composition, and a second carbonaceous material; and a third layer, which is disposed facing the first layer with the (Continued)

second layer interposed therebetween, and is formed from a porous carbon material having a specified bulk density.

14 Claims, 6 Drawing Sheets

(51) Int. Cl.
- *H01M 8/0297* (2016.01)
- *H01M 4/96* (2006.01)
- *H01M 8/0213* (2016.01)
- *H01M 8/0221* (2016.01)
- *H01M 8/0228* (2016.01)
- *H01M 8/0234* (2016.01)
- *H01M 8/0239* (2016.01)
- *H01M 8/0245* (2016.01)
- *H01M 4/88* (2006.01)

(52) U.S. Cl.
CPC ....... *H01M 8/0221* (2013.01); *H01M 8/0228* (2013.01); *H01M 8/0234* (2013.01); *H01M 8/0239* (2013.01); *H01M 8/0245* (2013.01); *H01M 8/188* (2013.01); *H01M 4/88* (2013.01); *Y02E 60/528* (2013.01); *Y02P 70/56* (2015.11)

(58) Field of Classification Search
CPC ............. H01M 8/0234; H01M 8/0239; H01M 8/0245; H01M 8/0297; H01M 8/188; Y02E 60/52; Y02P 70/56
See application file for complete search history.

(56) References Cited

FOREIGN PATENT DOCUMENTS

| | | | |
|---|---|---|---|
| GB | 2157482 | A | 10/1985 |
| JP | 62-276761 | A | 12/1987 |
| JP | 64-65776 | A | 3/1989 |
| JP | 6-290796 | A | 10/1994 |
| JP | 2000200619 | A | 7/2000 |
| JP | 2002-246035 | A | 8/2002 |
| JP | 2004-55271 | A | 2/2004 |
| JP | 2004-273299 | A | 9/2004 |
| JP | 2006-79856 | A | 3/2006 |
| JP | 2006-156029 | A | 6/2006 |
| JP | 2009-205901 | A | 9/2009 |
| JP | 4697901 | B1 | 6/2011 |
| JP | 2011-228059 | A | 11/2011 |
| KR | 10-2007-0112367 | A | 11/2007 |
| KR | 10-2008-0091842 | A | 10/2008 |
| WO | 2006135958 | A1 | 12/2006 |
| WO | 2008038835 | A1 | 4/2008 |
| WO | 2012/165492 | A1 | 12/2012 |

OTHER PUBLICATIONS

International Search Report for PCT/JP2014/059961 dated Jul. 8, 2014 [PCT/ISA/210].

Communication dated Aug. 31, 2016, from the European Patent Office in counterpart European Application No. 14782242.3.

CARBON MEMBER, CARBON MEMBER MANUFACTURING METHOD, REDOX FLOW BATTERY AND FUEL CELL

CROSS REFERENCE TO RELATED APPLICATIONS

This application is a National Stage of International Application No. PCT/JP2014/059961, filed on Apr. 4, 2014, which claims priority from Japanese Patent Application No. 2013-082949, filed on Apr. 11, 2013, the contents of all of which are incorporated herein by reference in their entirety.

BACKGROUND OF THE INVENTION

Field of the Invention

The present invention relates to a carbon member having a multilayer structure in which a carbon resin composition material layer and a porous carbon material layer are integrated into a single body, and a manufacturing method for the carbon member, and relates particularly to a carbon member that is suitable as a battery member for use in a battery such as a redox flow battery or a fuel cell, and a manufacturing method for the carbon member. Priority is claimed on Japanese Patent Application No. 2013-082949, filed Apr. 11, 2013, the content of which is incorporated herein by reference.

Description of Related Art

Conventionally, sintered carbon obtained by conducting sintering in a high-temperature process has been widely used as the material for carbon members used as battery members such as electrodes. By using sintered carbon, a high-performance carbon member having low electrical resistance and excellent heat resistance and corrosion resistance can be obtained.

However, carbon members formed from sintered carbon suffer from a number of problems, including being prone to cracking, having unsatisfactory flexural strength, and being difficult to handle. Accordingly, when batteries are manufactured using a carbon member formed from sintered carbon, the workability and processability are inadequate, and satisfactory productivity cannot be achieved.

As a result, in recent years, carbon resin composite materials formed from carbon and resins are increasingly being used as the materials for carbon members. Carbon members formed from carbon resin composite materials can easily be made with satisfactory flexural strength, and because these types of carbon members can be readily manufactured and processed using resin processing techniques, they are preferred.

However, carbon members formed from carbon resin composite materials have high electrical resistance compared with carbon members formed from sintered carbon. For example, if a battery is formed by stacking a carbon member formed from a carbon resin composite material and another battery member, then a problem arises in that the contract resistance between the carbon member and the other battery member is large. In particular, in those cases when the other battery member is formed from a material with a small compressive modulus such as a nonwoven fabric, felt or woven fabric, if the other battery member is laminated to the carbon member formed from a carbon resin composite material using a low surface pressure, then the contact resistance increases even further.

In those cases when a battery having a multilayer structure is formed by stacking a plurality of battery members, ensuring tight adhesion between adjacent battery members is an effective method for reducing the contact resistance between the plurality of battery members.

For example, techniques for lowering the contact resistance by integrating a plurality of battery members into a single body are disclosed in Patent Documents 1 to 4.

Further, use of an electrode material containing a gas phase method carbon fiber has been proposed as a technique for lowering the internal resistance of a battery (for example, see Patent Document 5).

Furthermore, a bipolar plate containing carbon nanotubes has been proposed as a device for improving the conductivity of a battery bipolar plate (for example, see Patent Document 6).

PRIOR ART DOCUMENTS

Patent Documents

Patent Document 1: Japanese Unexamined Patent Application, First Publication No. S62-276761
Patent Document 2: Japanese Unexamined Patent Application, First Publication No. H01-065776
Patent Document 3: Japanese Unexamined Patent Application, First Publication No. H06-290796
Patent Document 4: Japanese Unexamined Patent Application, First Publication No. 2004-273299
Patent Document 5: Japanese Unexamined Patent Application, First Publication No. 2006-156029
Patent Document 6: Japanese Unexamined Patent Application, First Publication No. 2011-228059

SUMMARY OF THE INVENTION

In a conventional carbon member, when adjacent battery members are welded together with an adhesive, achieving satisfactory conduction at the battery material interface has proven difficult. One conceivable solution to this problem may be to use a substance containing a conductive material as the adhesive. However, when adjacent battery members are welded together using a substance containing a conductive material as the adhesive, if the amount of the conductive material is increased to ensure satisfactory conduction at the battery member interface, then a problem arises in that the welding properties of the adhesive tend to be unsatisfactory, making the battery members prone to delamination.

Further, when a battery is manufactured using a battery member formed from a carbon member, it is desirable that the carbon member enables excellent productivity to be achieved.

The present invention has been developed in light of the above circumstances, and has an object of providing a carbon member which can be used favorably as a battery member of a redox flow battery or a fuel cell, has satisfactory conductivity and flexural strength, and yields excellent productivity when used as a battery member in the manufacture of a battery.

(1) A carbon member obtained by welding, into a single integrated body: a first layer which includes 100 parts by mass of a first resin composition containing a polyolefin-based resin and having a melt flow rate, measured at 230° C. with a load of 2.16 kg, of 0.01 to 10 g/10 min, and 100 to 1,000 parts by mass of a first carbonaceous material; a second layer, which is disposed in contact with at least one main surface of the first layer, and includes 100 parts by mass of a second resin composition containing a polyolefin-based resin, having a said melt flow rate of 5 to 1,000 g/10 min that is greater than that of the first resin composition, and having a melting point that is 80° C. or higher, but is at least 10° C. lower than that of the first resin composition, and 100 to 1,000 parts by mass of a second carbonaceous material; and a third layer, which is disposed facing the first layer with the second layer interposed therebetween, and is formed from a porous carbon material having a bulk density of 60 to 800 kg/m³.

(2) The carbon member disclosed in (1), wherein the first carbonaceous material and/or the second carbonaceous material contains 1 to 50 mass % of carbon fiber having an average fiber diameter of 0.01 to 0.3 μm.

(3) The carbon member disclosed in (1) or (2), wherein the porous carbon material is formed from carbon fiber having an average fiber diameter of 0.01 to 0.3 μm.

(4) The carbon member disclosed in any one of (1) to (3), wherein the first carbonaceous material and/or the second carbonaceous material contains 0.01 to 4 mass % of boron.

(5) The carbon member disclosed in any one of (1) to (4), wherein the first resin composition contains 10 to 99 mass % of a polypropylene resin, and 1 to 40 mass % of a styrene-based thermoplastic elastomer.

(6) The carbon member disclosed in any one of (1) to (5), wherein the second resin composition contains 10 to 100 mass % of at least one α-olefin polymer selected from the group consisting of:

(a) propylene-ethylene copolymers obtained by copolymerizing an ethylene unit with a propylene unit that functions as the main monomer unit, (b) ethylene-based copolymers obtained by copolymerizing an α-olefin unit having a carbon number of 3 to 10 with an ethylene unit that functions as the main monomer unit, and (c) polybutene-based resins obtained by copolymerizing an α-olefin having a carbon number of 2 to 10 (but excluding 1-butene) with a 1-butene unit that functions as the main monomer unit.

(7) The carbon member disclosed in any one of (1) to (6), wherein the second resin composition contains 2 to 40 mass % of an atactic polypropylene, 1 to 30 mass % of a tackifier resin, and 0.5 to 40 mass % of a styrene-based thermoplastic elastomer.

(8) The carbon member disclosed in any one of (1) to (7), wherein the porous carbon material is formed from a non-woven fabric containing carbon fibers, and at least a portion of the contact portions between the carbon fibers are carbonized, causing welding of the carbon fibers.

(9) A carbon member manufacturing method including: a step of performing co-extrusion molding of a first layer which includes 100 parts by mass of a first resin composition containing a polyolefin-based resin and having a melt flow rate, measured at 230° C. with a load of 2.16 kg, of 0.01 to 10 g/10 min, and 100 to 1,000 parts by mass of a first carbonaceous material, and a second layer which includes 100 parts by mass of a second resin composition containing a polyolefin-based resin, having an aforementioned melt flow rate of 5 to 1,000 g/10 min that is greater than that of the first resin composition, and having a melting point that is 80° C. or higher, but is at least 10° C. lower than that of the first resin composition, and 100 to 1,000 parts by mass of a second carbonaceous material, thereby forming a laminate in which the second layer is disposed in contact with at least one main surface of the first layer, and the first layer and the second layer are integrated into a single body; and a step of disposing a third layer, formed from a porous carbon material having a bulk density of 60 to 800 kg/m³, facing the first layer of the laminate with the second layer interposed therebetween, and welding the second layer to the third layer at a temperature that is at least as high as the melting point of the second layer.

(10) A carbon member manufacturing method including: a first molding step of performing extrusion molding of a first layer which includes 100 parts by mass of a first resin composition containing a polyolefin-based resin and having a melt flow rate, measured at 230° C. with a load of 2.16 kg, of 0.01 to 10 g/10 min, and 100 to 1,000 parts by mass of a first carbonaceous material; a second molding step of performing extrusion molding of a second layer which includes 100 parts by mass of a second resin composition containing a polyolefin-based resin, having an aforementioned melt flow rate of 5 to 1,000 g/10 min that is greater than that of the first resin composition, and having a melting point that is 80° C. or higher, but is at least 10° C. lower than that of the first resin composition, and 100 to 1,000 parts by mass of a second carbonaceous material; a step of disposing the second layer in contact with at least one main surface of the first layer, and welding the second layer to the first layer at a temperature that is at least as high as the melting points of the first layer and the second layer, thereby forming a laminate in which the first layer and the second layer are integrated into a single body; and a step of disposing a third layer, formed from a porous carbon material having a bulk density of 60 to 800 kg/m³, facing the first layer of the laminate with the second layer interposed therebetween, and welding the second layer to the third layer at a temperature that is at least as high as the melting point of the second layer.

(11) The carbon member manufacturing method disclosed in (10), wherein in the first molding step, a step of supplying the first resin composition and the first carbonaceous material to the inlet of a twin screw extruder and performing mixing to obtain a first mixture, and a step of extruding the first mixture through the die of the twin screw extruder to mold a sheet-like first layer are performed continuously.

(12) The carbon member manufacturing method disclosed in (10) or (11), wherein in the second molding step, a step of supplying the second resin composition and the second carbonaceous material to the inlet of a twin screw extruder and performing mixing to obtain a second mixture, and a step of shaping and extruding the second mixture through the die of the twin screw extruder to mold a sheet-like second layer are performed continuously.

(13) A redox flow battery having a cell containing an electrode and a bipolar plate disposed on each side of a diaphragm, wherein the carbon member disclosed in any one of (1) to (8) is disposed on one side or both sides of the diaphragm as a battery member that integrates the electrode and the bipolar plate into a single body.

(14) A fuel cell having a plurality of unit cells, each containing a fuel electrode and a first gas diffusion layer disposed on one surface of an electrolyte membrane and an air electrode and a second gas diffusion layer disposed on the other surface of the electrolyte membrane, stacked with a separator interposed between the first gas diffusion layer and the second gas diffusion layer, wherein the carbon member disclosed in any one of (1) to (8) is provided as a battery member that integrates the separator, and the first gas diffusion layer and/or the second gas diffusion layer positioned adjacent to the separator, into a single body.

The carbon member of the present invention is obtained by welding, into a single integrated body: a first layer containing a first resin composition and a first carbonaceous material, a second layer disposed in contact with at least one main surface of the first layer and containing a second resin composition and a second carbonaceous material, and a third layer, which is disposed facing the first layer with the second layer interposed therebetween and is formed from a porous carbon material, and the resulting carbon member has low resistance in the thickness direction (penetration resistance), excellent conductivity and superior flexural strength.

Further, when the carbon member of the present invention is used as a battery member in the manufacture of a battery, excellent workability and processability can be achieved, and the first layer of the carbon member can function, for example, as a bipolar plate of a redox flow battery or a separator of a fuel cell.

For example, the carbon member of the present invention can be used favorably as a battery member that an electrode and a bipolar plate of a redox flow battery are integrated into a single body. In this case, because the number of battery members can be reduced compared with the case where the redox flow battery is manufactured using an electrode and a bipolar plate respectively, the productivity can be improved.

Furthermore, when the carbon member of the present invention is used as a battery member in the manufacture of a battery, the third layer of the carbon member can function, for example, as an electrode of a redox flow battery or a gas diffusion layer that is adjacent to a separator of a fuel cell.

For example, the carbon member of the present invention can be used favorably as a battery member that a separator of a fuel cell and a gas diffusion layer that is adjacent to the separator are integrated into a single body. In this case, because the separator and the gas diffusion layer that is adjacent to the separator can be manufactured easily, the productivity can be improved.

DETAILED DESCRIPTION OF THE INVENTION

Figure 1:
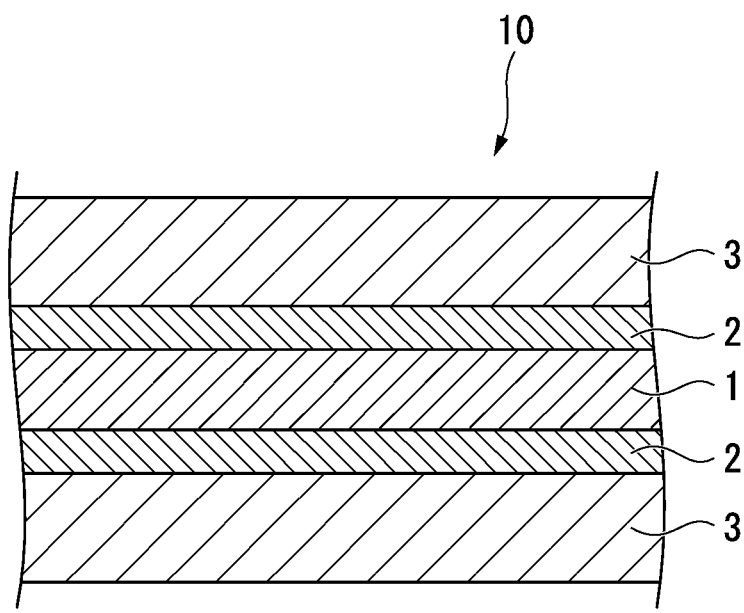
FIG. 1 is a schematic cross-sectional view for describing one example of a carbon member of the present invention.

Embodiments of the present invention are described below in detail.
[Carbon Member]
FIG. 1 is a schematic cross-sectional view for describing one example of the carbon member of the present invention.

The carbon member 10 illustrated in FIG. 1 is obtained by welding, into a single integrated body: a first layer 1 containing a first resin composition and a first carbonaceous material; second layers 2, each disposed in contact with one of the two surfaces of the first layer, and containing a second resin composition and a second carbonaceous material; and third layers 3, each disposed facing the first layer with one of the second layers 2 interposed therebetween, and formed from a porous carbon material.
[First Layer]
The first layer 1 contains a first resin composition and a first carbonaceous material.

The first resin composition contains a polyolefin-based resin, and has a melt flow rate, measured at 230° C. with a load of 2.16 kg, of 0.01 to 10 g/10 min.

In the following description, the "melt flow rate" means the melt flow rate measured at 230° C. with a load of 2.16 kg, and is often abbreviated as "MFR". Measurement of the melt flow rate is conducted in accordance with ISO 1133.

In the present embodiment, because the MFR of the first resin composition is 0.01 g/10 min or greater, the mixture of the first resin composition and the first carbonaceous material can be molded into the desired shape, and the first layer is able to function as a partition wall that divides the inside of the battery. The MFR of the first resin composition is preferably 0.5 g/10 min or greater. Further, because the MFR of the first resin composition is not more than 10 g/10 min, a carbon member 10 having superior flexural strength can be obtained. The MFR of the first resin composition is preferably not more than 6 g/10 min, and more preferably 2 g/10 min or less.

Examples of the first resin composition include compositions containing at least one polyolefin-based resin selected from among copolymers containing 50 to 100 mol % of monomer units derived from an olefin, and modified resins thereof. Specific examples of the polyolefin-based resin include linear low-density polyethylene (LLDPE), low-density polyethylene (LDPE), very-low-density polyethylene (VLDPE), medium-density polyethylene (MDPE), high-density polyethylene (HDPE), ethylene-vinyl acetate copolymers (EVA), cycloolefin polymers, polyvinyl chloride, polypropylene, polystyrene, ionomers, ethylene-propylene copolymers (block PP and random PP), propylene-α-olefin (α-olefin having a carbon number of 4 to 20) copolymers, polybutene-1 and polypentene.

The first resin composition preferably contains 10 to 100 mass % (wt %), and more preferably 80 to 98 mass %, of one or more of these polyolefin-based resins.

The first resin composition may also contain a styrene-based thermoplastic elastomer in addition to the polyolefin-based resin. A styrene-based thermoplastic elastomer is either a thermoplastic elastomer containing 10 to 90 mol % of monomer units derived from styrene or a substituted styrene, or a hydrogenated product thereof. It is preferable that the first resin composition contains a styrene-based thermoplastic elastomer, because the flexural strain increases and cracking becomes less likely.

Examples of the styrene-based thermoplastic elastomer include hydrogenated styrene-butadiene rubber (HSBR), styrene-ethylene/butylene-styrene block copolymers (SEBS), styrene-ethylene/propylene-styrene block copolymers, styrene-ethylene/butylene-olefin crystalline block copolymers, styrene-isoprene-styrene block copolymers, and styrene-butadiene-styrene block copolymers. Among these, one or more resins selected from among hydrogenated styrene-butadiene rubber, styrene-ethylene/butylene-styrene block copolymers and styrene-ethylene/propylene-styrene block copolymers yield better dispersibility in the polyolefin-based resin, and are therefore preferred.

It is particularly preferable that the first resin composition contains a polypropylene resin and a styrene-based thermoplastic elastomer. This type of first resin composition becomes a material that has both heat resistance and good cracking resistance, and is therefore preferred.

When the first resin composition contains a polypropylene resin and a styrene-based thermoplastic elastomer, the first resin composition preferably contains 10 to 99 mass % of the polypropylene resin and 1 to 40 mass % of the styrene-based thermoplastic elastomer, and more preferably contains 80 to 98 mass % of the polypropylene resin and 2 to 20 mass % of the styrene-based thermoplastic elastomer.

When the amount of the polypropylene resin contained within the first resin composition satisfies the above range, the melting point of the first resin composition is high, and the affinity of the composition for graphite improves, both of which are desirable.

When the amount of the styrene-based thermoplastic elastomer contained within the first resin composition satisfies the above range, flexibility can be imparted to the composition without impairing the heat resistance, which is desirable.

If required, the first resin composition may also contain any of various additives, including components selected from among plasticizers, solvents, ultraviolet stabilizers, antioxidants, heat stabilizers, antifoaming agents, leveling agents, release agents, lubricants, water repellent preparations, thickeners, and hydrophilicity-imparting agents. The amount of these additives typically totals 0.1 to 10 parts by mass per 100 parts by mass of the combination of the polypropylene resin and the styrene-based thermoplastic elastomer.

Examples of materials that can be used as the first carbonaceous material include fine carbon powder, carbon fiber, and mixtures of a fine carbon powder and carbon fiber.

In those cases when the first carbonaceous material contains a fine carbon powder, the fine carbon powder is preferably a fine graphite powder having an average particle size of 10 to 50 μ, and more preferably a fine graphite powder having an average particle size of 10 to 30 μm. Provided the average particle size of the fine carbon powder satisfies the above range, a good balance can be achieved between the moldability of the mixture containing the first resin composition and the first carbonaceous material, and the mechanical strength of the resulting carbon member 10, which is very desirable. Further, when the first carbonaceous material is formed from a fine graphite powder, the conductivity of the carbon member 10 improves, which is also desirable.

The average particle size of the fine carbon powder is determined by observing 100 to 1,000 individual fine carbon powder particles under an optical microscope, measuring the maximum diameter of each particle, and then calculating the arithmetic mean of all the measured values.

It is preferable that the first carbonaceous material contains carbon fiber, because it enables a carbon member 10 having excellent strength to be obtained. When the first carbonaceous material contains carbon fiber, the material preferably contains 1 to 50 mass %, and more preferably 10 to 40 mass %, of carbon fiber having an average fiber diameter of 0.01 to 0.3 μm. Provided the average fiber diameter of the carbon fiber satisfies the above range, the strength can be improved and a conductive path can be formed with the addition of a small amount of carbon fiber. The average fiber diameter of the carbon fiber is determined by observing 100 to 1,000 individual carbon fibers using an optical microscope or a scanning electron microscope, measuring the fiber diameter of each fiber, and then calculating the arithmetic mean of all the measured fiber diameter values.

The first carbonaceous material preferably also contains boron. In those cases when the first carbonaceous material contains boron, the amount of boron within the first carbonaceous material is preferably from 0.01 to 4 mass %, and more preferably from 0.1 to 3 mass %. Provided the amount of boron in the first carbonaceous material satisfies the above range, the conductivity of the carbon member 10 improves favorably.

The first layer 1 contains 100 parts by mass of the first resin composition and from 100 to 1,000 parts by mass of the first carbonaceous material, and preferably contains 200 to 800 parts by mass of the first carbonaceous material per 100 parts by mass of the first resin composition, and more preferably contains 400 to 800 parts by mass of the first carbonaceous material per 100 parts by mass of the first resin composition.

Provided the amount of the first carbonaceous material is at least 100 parts by mass per 100 parts by mass of the first resin composition, the carbon member 10 exhibits excellent conductivity. Further, provided the amount of the first carbonaceous material is not more than 1,000 parts by mass per 100 parts by mass of the first resin composition, the carbon member 10 exhibits superior strength.

[Second Layer]

The second layer 2 contains a second resin composition and a second carbonaceous material.

The second resin composition contains a polyolefin-based resin, and has a melt flow rate (MFR), measured at 230° C. with a load of 2.16 kg, of 5 to 1,000 g/10 min that is greater than that of the first resin composition. The MFR of the second resin composition is preferably from 10 to 100 g/10 min, and more preferably from 10 to 60 g/10 min. Provided the MFR of the second resin composition satisfies the above range, a resin composition that can be readily filled with a carbonaceous material is obtained, and the welding strength between the second layer and the first and third layers is improved, both of which are desirable.

The melting point of the second resin composition is 80° C. or higher, but is at least 10° C. lower than that of the first resin composition.

Provided the melting point is at least 80° C., a carbon member 10 having satisfactory heat resistance can be obtained, and provided the melting point is at least 10° C. lower than that of the first resin composition, heat damage to the first layer can be reduced when heat is applied to weld the first layer and the third layer together with the second layer interposed therebetween. The melting point of the second resin composition is preferably 100° C. or greater, and more preferably 120° C. or greater. Further, the melting point of the second resin composition is typically 145° C. or lower. There are no particular limitations on the difference between the melting points of the first resin composition and the second resin composition, if the difference is at least 10° C., but the difference is typically not more than 60° C. The melting point of the resin compositions can be measured in accordance with JIS K7121, by preparing a test piece in a standard state, and then using a differential scanning calorimeter (DSC) to measure the melting point as the melt peak temperature. When two or more melt peaks are observed, the highest peak temperature is deemed to represent the melting point.

In the present embodiment, because the second resin composition has an MFR of 5 to 1,000 g/10 min that is greater than that of the first resin composition, and has a melting point that is 80° C. or higher, but at least 10° C. lower than that of the first resin composition, the differences in the MFR and the melting point between the first layer 1 and the second layer 2 can be utilized so that, for example, by stacking the first layer 1 (third layer 3) on the second layer 2 and performing heating while applying pressure, the second layer 2 can be welded easily and reliably to the first layer 1, and the second layer 2 that has been formed on the first layer 1 can be welded on the third layer 3 formed from a porous carbon material.

The second resin composition having an MFR of 5 to 1,000 g/10 min is preferably a composition containing an α-olefin polymer. Specific examples of the α-olefin polymer include α-olefin homopolymers such as atactic polypropylene (atactic PP), isotactic polypropylene and polybutene-1, copolymers such as ethylene-vinyl acetate copolymers (EVA) and copolymers of propylene and an α-olefin having a carbon number of 2 to 8, the α-olefin copolymers (a), (b) and (c) described below, and modified resins of the above polymers. These α-olefin polymers may be used individually, or in combinations containing two or more polymers.

α-olefin copolymer (a): a propylene-ethylene copolymer obtained by copolymerizing an ethylene unit with a propylene unit that functions as the main monomer unit. Specific examples of the α-olefin copolymer (a) include ethylene-propylene random copolymers and ethylene-propylene block copolymers.

α-olefin copolymer (b): an ethylene-based copolymer obtained by copolymerizing an α-olefin unit having a carbon number of 3 to 10 with an ethylene unit that functions as the main monomer unit. Specific examples of the α-olefin copolymer (b) include linear low-density polyethylene (LLDPE), low-density polyethylene (LDPE), very-low-density polyethylene (VLDPE) and medium-density polyethylene (MDPE).

α-olefin copolymer (c): a polybutene-based resin obtained by copolymerizing an α-olefin having a carbon number of 2 to 10 (but excluding 1-butene) with a 1-butene unit that functions as the main monomer unit. Specific examples of the α-olefin copolymer (c) include ethylene-butene-1 copolymers, propylene-butene-1 copolymers and hexene-butene-1 copolymers.

In those cases when the second resin composition contains an α-olefin polymer, the amount of the α-olefin polymer in the second resin composition is preferably from 10 to 100 mass %, and more preferably from 50 to 100 mass %. When the amount of the α-olefin polymer contained within the second resin composition satisfies the above range, the interface strength between the second layer and the first layer is excellent, which is very desirable.

Among the various α-olefin polymers mentioned above, the second resin composition preferably contains an α-olefin copolymer, and more preferably contains at least one α-olefin copolymer selected from among the copolymers (a), (b) and (c) described above. The reason for this preference is that by using a second resin composition containing one of these types of α-olefin copolymers, superior welding properties can be achieved between the second layer and the first and third layers. The amount of this α-olefin copolymer selected from among the copolymers (a), (b) and (c) contained within the second resin composition is preferably from 10 to 100 mass %, and more preferably from 50 to 100 mass %.

Further, the second resin composition preferably also contains at least one tackifier resin or styrene-based thermoplastic elastomer in addition to the polyolefin-based resin.

In particular, those cases when the second resin composition contains an atactic polypropylene, a tackifier resin and a styrene-based thermoplastic elastomer are preferable, as they yield good improvement in the welding properties between the second layer and the third layer.

Examples of the tackifier resin include alicyclic saturated hydrocarbon resins, aliphatic petroleum resins, terpene-based resins, hydrogenated terpene-based resins, rosin-based resins, styrene-based resins, acrylic resins, silicone resins, phenolic resins, xylene resins and coumarone-indene-based resins, and an alicyclic saturated hydrocarbon resin is preferred.

Examples of styrene-based thermoplastic elastomers that can be used include the same elastomers as those mentioned above for use in the first resin composition.

With this type of second resin composition, the composition preferably contains 2 to 40 mass % of the atactic polypropylene, 1 to 30 mass % of the tackifier resin and 0.5 to 40 mass % of the styrene-based thermoplastic elastomer, more preferably contains 5 to 40 mass % of the atactic polypropylene, 5 to 25 mass % of the tackifier resin and 5 to 30 mass % of the styrene-based thermoplastic elastomer, and still more preferably contains 15 to 40 mass % of the atactic polypropylene, 10 to 20 mass % of the tackifier resin and 10 to 20 mass % of the styrene-based thermoplastic elastomer.

When the amount of the atactic polypropylene contained within the second resin composition satisfies the above range, the welding strength between the second layer and the first layer and between the second layer and the third layer improves favorably.

When the amount of the tackifier resin contained within the second resin composition satisfies the above range, the low-temperature welding properties between the second layer and the first layer and between the second layer and the third layer improve, which is desirable.

When the amount of the styrene-based thermoplastic elastomer contained within the second resin composition satisfies the above range, the composition is imparted with elasticity and the welding properties relative to irregular shapes improves, which is also desirable.

The second resin composition may also contain, in addition to the components described above, the same variety of additives as those mentioned for the first resin composition. The addition amount of these additives typically totals 0.1 to 10 parts by mass per 100 parts by mass of the combination of the polyolefin-based resin, the tackifier resin and the styrene-based thermoplastic elastomer.

For the second carbonaceous material, the same materials as those described for the first carbonaceous material can be used. The second carbonaceous material may be the same as, or different from, the first carbonaceous material. Specifically, the average particle size, the average fiber diameter, the carbon fiber, and the boron content and the like of the second resin composition may be either the same as, or different from, those of the first carbonaceous material.

In a similar manner to the first carbonaceous material, the second carbonaceous material preferably contains 1 to 50 mass %, and more preferably 10 to 40 mass %, of carbon fiber having an average fiber diameter of 0.01 to 0.3 μm.

Further, in a similar manner to the first carbonaceous material, the second carbonaceous material preferably contains 0.01 to 4 mass %, and more preferably 0.1 to 3 mass %, of boron.

The second layer 2 contains 100 parts by mass of the second resin composition and 100 to 1,000 parts by mass of the second carbonaceous material.

Provided the amount of the second carbonaceous material is at least 100 parts by mass per 100 parts by mass of the second resin composition, a carbon member 10 that exhibits excellent conductivity can be obtained. Further, provided the amount of the second carbonaceous material is not more than 1,000 parts by mass per 100 parts by mass of the second resin composition, the weldability of the second layer with the first and third layers is excellent, meaning a carbon member 10 having superior flexural strength can be obtained. The amount of the second carbonaceous material is preferably from 200 to 800 parts by mass, and more preferably from 200 to 600 parts by mass, per 100 parts by mass of the second resin composition.

[Third Layer]

The third layer 3 is formed from a porous carbon material which has a bulk density of 60 to 800 kg/m$^3$, and preferably 80 to 600 kg/m$^3$. In the present embodiment, because the bulk density of the porous carbon material is at least 60 kg/m$^3$, the third layer exhibits excellent conductivity and strength. Further, because the bulk density of the porous carbon material is not more than 800 kg/m$^3$, the third layer has superior fluid permeability. Accordingly, when the carbon member 10 is used as a battery member to manufacture a battery, the third layer 3 can function, for example, as an electrode of a redox flow battery, or as a gas diffusion layer adjacent to a separator in a fuel cell.

The porous carbon material of the third layer 3 is preferably a non-woven fabric formed from carbon fiber having an average fiber diameter of 0.01 to 3 μm, and is more preferably a non-woven fabric formed from carbon fiber having an average fiber diameter of 0.1 to 0.5 μm. The use of a non-woven fabric in which at least a portion of the contact portions between the carbon fibers are carbonized, causing welding of the carbon fibers, is preferable. When at least a portion of the contact portions between the carbon fibers are carbonized, causing welding of the carbon fibers, the third layer 3 exhibits satisfactory strength, and also has satisfactory conductivity, both of which are desirable.

When the porous carbon material of the third layer 3 is a non-woven fabric formed from carbon fiber having an average fiber diameter of 0.01 to 3 μm, being satisfactorily fine, and the resulting carbon member 10 of the present embodiment is used as a battery member in the manufacture of a battery, then the pressure loss when a fluid flows through the interior of the third layer 3 can be reduced. As a result, the output density of the battery can be improved.

Furthermore, when the porous carbon material is a non-woven fabric formed from carbon fiber having an average fiber diameter of 0.01 to 3 μm, because the specific surface area of the carbon fiber is large, so that excellent conductivity can be obtained. As a result, when the carbon member 10 of the present embodiment is used as a battery member in the manufacture of a redox flow battery, reaction sites on the electrode increases, and the output density of the battery can be improved. Moreover, in a fuel cell in which the carbon member 10 of the present embodiment is used as a battery member, gas can be diffused uniformly, the battery reaction can be made more uniform, and the output density can be improved. Measurement of the average fiber diameter of the carbon fiber can be conducted in the same manner as that described above for the carbon fiber used in the aforementioned first carbonaceous material.

A porous carbon material composed of a non-woven fabric formed from carbon fiber having an average fiber diameter of 0.01 to 3 μm, in which at least a portion of the contact portions between the carbon fibers are carbonized, causing welding of the carbon fibers, can be obtained, for example, using the method describe below.

First, resin fibers are felted to prepare a non-woven fabric. The non-woven fabric is then carbonized. This process yields a non-woven fabric containing carbon fiber, in which at least a portion of the contact portions between the carbon fibers is carbonized, causing welding of the carbon fibers. Examples of the resin fibers used as the material for the non-woven fabric include resin fibers formed from a polyacrylonitrile resin or a phenolic resin or the like. Subsequently, in the case of a redox flow battery application, in order to improve the welding properties of the second and third layers, and improve the water wettability to promote the electrode reaction, the non-woven fabric containing the carbon fiber is subjected to a heat treatment at a temperature of 400 to 800° C. in a mixed atmosphere containing an inert gas and 1 to 40% of oxygen. This treatment causes oxidation of the surfaces of the carbon fibers, yielding the porous carbon material. Further, in the case of a fuel cell application or the like that requires water repellency, a porous carbon material obtained, for example, by applying a polytetrafluoroethylene (PTFE) dispersion to the non-woven fabric containing the carbon fiber, drying the dispersion, and then performing a heat treatment at 300 to 400° C. may be used.

It is preferable that the porous carbon material contains from 0.01 to 4 mass % of boron, because the resulting carbon member 10 exhibits excellent conductivity.

[Carbon Member Manufacturing Method]

The carbon member manufacturing method of the present invention is described below using the manufacturing method for the carbon member 10 illustrated in FIG. 1 as an example.

In order to manufacture the carbon member 10 illustrated in FIG. 1, first, the first resin composition and the first carbonaceous material are mixed and kneaded (compounded) in a prescribed ratio to prepare a mixture. Further, the second resin composition and the second carbonaceous material are also mixed and kneaded (compounded) in a prescribed ratio to prepare a mixture.

The first resin composition compounded with the first carbonaceous material may exist in the form of a first resin composition obtained by compounding the raw materials for the first resin composition in advance, or may exist as the separate raw materials for the first resin composition. Similarly, the second resin composition compounded with the second carbonaceous material may exist in the form of a second resin composition obtained by compounding the raw materials for the second resin composition in advance, or may exist as the separate raw materials for the second resin composition.

A mulling machine such as an extruder or a kneader can be used for compounding only the raw materials for the first resin composition (second resin composition) in order to prepare the first resin composition (second resin composition), and/or for compounding the first resin composition (second resin composition) and the first carbonaceous material (second carbonaceous material) in order to prepare the aforementioned mixture.

Subsequently, using the mixture of the first resin composition and the first carbonaceous material, and the mixture of the second resin composition and the second carbonaceous material, the first layer 1 and the second layers 2 are formed by co-extrusion molding. As a result, sheet-like second layers 2 are disposed in contact with the two sides of a sheet-like first layer 1, and a laminate is formed in which the first layer 1 and the second layers 2 are integrated into a single body. During this process, the extrusion of the first layer is preferably performed at a cylinder temperature of 220 to 250° C. and a die temperature of 160 to 200° C., and the extrusion of the second layers 2 is preferably performed at a cylinder temperature of 180 to 230° C. and a die temperature of 120 to 180° C.

Next, the third layers 3 are provided as a porous carbon material on both surfaces of the laminate. As a result, each layer 3 is disposed facing the first layer 1 with a second layer 2 interposed therebetween. In this process, an elongated third layer 3 may be fed from a roller and positioned continuously on the sheet-like laminate, with the welding step described below also performed in a continuous manner.

Next, the structure containing the third layers 3 disposed on both surfaces of the laminate containing the second layers 2 on the two surfaces of the first layer 1 is heated while pressure is applied, thereby welding the second layers 2 to the third layers 3.

In order to ensure low contact resistance between the second layers 2 and the third layers 3, the temperature when welding the second layers 2 to the third layers 3 is set to a temperature that is at least as high as the melting point of the second resin composition, preferably a temperature that is at least 2° C. higher than the melting point of the second resin composition, and more preferably a temperature that is at least 5° C. higher than the melting point of the second resin composition. Further, in order to prevent melting of the first layer, the temperature when welding the second layers 2 to the third layers 3 is preferably a temperature that is at least 10° C. lower than the melting point of the first resin composition, and is typically a temperature of 160° C. or lower. If the first layer melts, then the first layer swells and the density decreases, meaning the penetration resistance of the carbon member 10 tends to increase.

Further, in order to ensure no damage to the structure of the third layers 3, the pressure applied when welding the second layers 2 to the third layers 3 is preferably within a range from 0.5 to 8 MPa, and more preferably from 1 to 5 MPa. The above steps enable the carbon member 10 illustrated in FIG. 1 to be obtained.

Further, the manufacturing method for the carbon member 10 illustrated in FIG. 1 is not limited to the method described above. For example, the carbon member 10 illustrated in FIG. 1 may also be manufactured using the manufacturing method described below.

First, a mixture of the first resin composition and the first carbonaceous material is prepared in the same manner as that described for the above manufacturing method, and the resulting mixture is then subjected to extrusion molding to form a sheet-like first layer 1 (the first molding step). During this step, the cylinder temperature is preferably from 220 to 250° C., and the die temperature is preferably from 160 to 200° C. If required, the thickness of the thus obtained sheet-like first layer 1 may be reduced by using a rolling method or the like.

In order to improve the productivity, the first molding step is preferably a step in which a step of supplying the first resin composition and the first carbonaceous material to the inlet of a twin screw extruder and performing mixing to prepare a first mixture, and a step of shaping and extruding the first mixture through the die of the twin screw extruder to mold the sheet-like first layer are performed continuously.

Further, a mixture of the second resin composition and the second carbonaceous material is also prepared in the same manner as the manufacturing method described above, and the resulting mixture is then subjected to extrusion molding to form sheet-like second layers 2 (the second molding step). During this step, the cylinder temperature is preferably from 180 to 230° C., and the die temperature is preferably from 120 to 180° C. If required, the thickness of the thus obtained sheet-like first layers 2 may be reduced by using a rolling method or the like.

In order to improve the productivity, the second molding step is preferably a step in which a step of supplying the second resin composition and the second carbonaceous material to the inlet of a twin screw extruder and performing mixing to prepare a second mixture, and a step of shaping and extruding the second mixture through the die of the twin screw extruder to mold a sheet-like second layer are performed continuously.

Next, the sheet-like second layers 2 are disposed in contact with the two sides of the sheet-like first layer 1, and by heating the resulting structure while applying pressure, the second layers 2 are welded to the first layer 1. As a result, a laminate is formed in which the first layer 1 and the second layers 2 disposed in contact with both sides of the first layer 1 are integrated into a single body.

The temperature during welding of the second layers 2 to the first layer 1 is set to a temperature that is at least as high as the melting points of the first layer 1 and the second layers 2, and in order to reduce the contact resistance between the first layer 1 and the second layers 2 and achieve a strong bond, the temperature is preferably at least 20° C. higher, and more preferably at least 40° C. higher, than the melting point of the first resin composition, and is typically within a range from 180 to 250° C. Further, in terms of the pressure applied during the welding of the first layer 1 and the second layers 2, in order to ensure that the layers bond reliably with no residual voids at the interfaces, the pressure is preferably from 10 to 50 MPa.

Subsequently, in the same manner as that described for the above manufacturing method, a porous carbon material is disposed as the third layer 3 on each of the surfaces of the laminate, and these second layers 2 are welded to the third layers 3. The above steps enable the carbon member 10 illustrated in FIG. 1 to be obtained.

[Redox Flow Battery]

Figure 2:
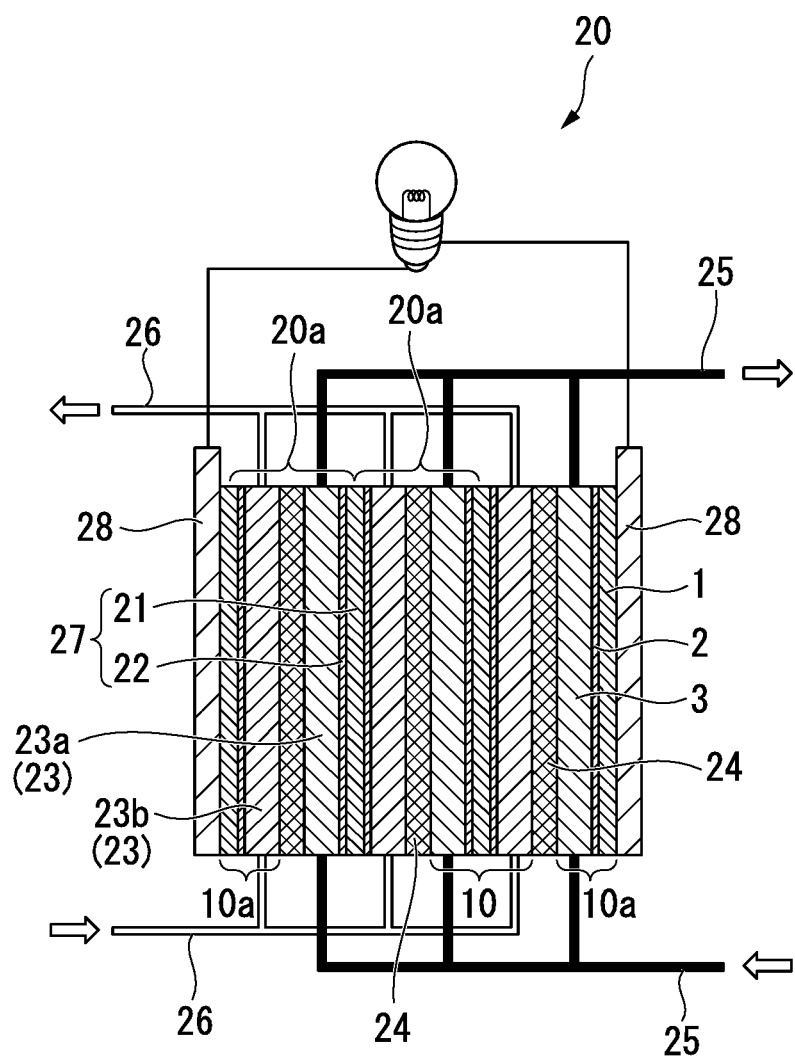
FIG. 2 is a schematic cross-sectional view for describing one example of a redox flow battery of the present invention.

FIG. 2 is a schematic cross-sectional view for describing one example of a redox flow battery of the present invention. The redox flow battery 20 illustrated in FIG. 2 contains a plurality of cells 20*a* disposed between copper plates 28. Each cell 20*a* has an electrode 23 and a bipolar plate 27 disposed on each side of a diaphragm 24. The bipolar plate 27 used in the present embodiment is formed from a bipolar plate main body 21 and a bipolar plate surface layer 22 that is disposed between the bipolar plate main body 21 and the electrode 23. The bipolar plate main body 21 is common to two cells 20a disposed adjacent to each other.

Each cell 20*a* is provided with a positive electrode 23*a* and a negative electrode 23*b* as the electrodes 23. The positive electrode 23*a* of each cell 20*a* is disposed opposing the negative electrode 23*b* of the adjacent cell 20*a* with the bipolar plate interposed therebetween. The positive electrode 23*a* and the negative electrode 23*b* are formed from porous carbon materials, and a positive electrode electrolyte is supplied to the interior of the positive electrode 23*a* through a positive electrode line 25, while a negative electrode electrolyte is supplied to the interior of the negative electrode 23b through a negative electrode line 26.

In the present embodiment, as illustrated in FIG. 2, a carbon member 10 illustrated in FIG. 1 is disposed on each side of the diaphragm 24 as an integrated battery member containing the electrode 23 and the bipolar plate 27, thereby forming a structure having a plurality of stacked cells 20a. Accordingly, the first layer 1 in the carbon member 10 illustrated in FIG. 1 functions as the bipolar plate main body 21, each second layer 2 functions as a bipolar plate surface layer 22, and each third layer 3 functions as an electrode 23.

Further, as illustrated in FIG. 2, a carbon member 10a containing a positive electrode 23a or a negative electrode 23b and a bipolar plate 27 integrated into a single body is provided on the outside of each of the two outermost diaphragms 24 among the plurality of diaphragms 24. The carbon member 10a is prepared by welding and integrating a first layer 1, a second layer 2 disposed in contact with one main surface of the first layer 1, and a third layer 3 which is disposed facing the first layer 1 with the second layer 2 interposed therebetween, and with the exception that the second layer 2 and the third layer 3 are formed on only one of the main surfaces of the first layer 1, is the same as the carbon member 10 illustrated in FIG. 1.

There are no particular limitations on the redox flow battery of the present invention, with the exception of using the carbon members 10 and 10a of the present invention as battery members, and conventional materials can be used for the diaphragms, the positive electrode electrolyte and the negative electrode electrolyte and the like.

In the redox flow battery 20 illustrated in FIG. 2, the cells 20a can be assembled easily by stacking the diaphragm 24, the carbon member 10 and the carbon member 10a. In other words, because the redox flow battery 20 illustrated in FIG. 2 uses the carbon members 10 and 10a as battery members that integrate an electrode 23 and a bipolar plate 27 into a single body, the number of battery members can be reduced considerably compared with the case where the redox flow battery is manufactured using individual electrodes and bipolar plates, and therefore the productivity can be improved.

The redox flow battery 20 illustrated in FIG. 2 uses the carbon members 10 and 10a of the present invention as battery members, and therefore a battery of low internal resistance having electrodes 23 of superior conductivity can be obtained.

[Fuel Cell]

Figure 3:
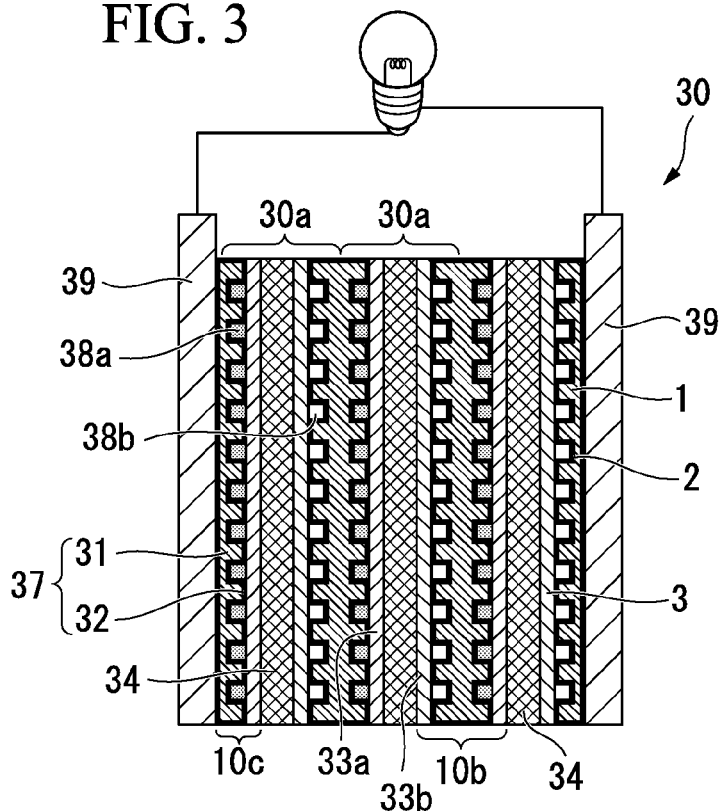
FIG. 3 is a schematic cross-sectional view for describing one example of a fuel cell of the present invention.

FIG. 3 is a schematic cross-sectional view for describing one example of a fuel cell of the present invention The fuel cell 30 illustrated in FIG. 3 contains a plurality of unit cells 30a disposed between current collectors 39. Each unit cell 30a has a first gas diffusion layer 33a and a first gas passage 38a disposed on one of the main surfaces of an MEA (membrane electrode assembly) 34, and a second gas diffusion layer 33b and a second gas passage 38b disposed on the other main surface of the MEA 34. The MEA 34 is an assembly in which an electrode that functions as the air electrode is welded to one of the main surfaces of an electrolyte membrane, and an electrode that functions as the fuel electrode is welded to the other main surface. The first gas diffusion layer 33a and the second gas diffusion layer 33b may also function as the electrodes.

As illustrated in FIG. 3, the plurality of unit cells 30a are stacked with a separator 37 separating the first gas passage 38a and the first gas diffusion layer 33a from the second gas passage 38b and the second gas diffusion layer 33b. In the present embodiment, the separator 37 is composed of a separator main body 31, and a separator surface layer 32 that is disposed between the separator main body 31 and the first gas diffusion layer 33a or second gas diffusion layer 33b. The separator main body 31 is common to two unit cells 30a disposed adjacent to each other.

The first gas diffusion layer 33a of each unit cell 30a is disposed facing the second gas diffusion layer 33b with the MEA 34 interposed therebetween. The first gas diffusion layer 33a and the second gas diffusion layer 33b are formed from porous carbon materials, and a fuel such as hydrogen is supplied to the interior of the first gas diffusion layer 33a through a line (not shown in the drawing), while air is supplied to the interior of the second gas diffusion layer 33b through another line (not shown in the drawing).

The first gas passage 38a and the second gas passage 38b are each composed of a plurality of linear channels provided in the surface of the separator 37.

In the present embodiment, a carbon member 10b is provided as an integrated cell member which contains the separator 37 and the first gas diffusion layer 33a and the second gas diffusion layer 33b disposed adjacent to the separator 37 integrated into a single body. The carbon member 10b is the same as the carbon member 10 illustrated in FIG. 1, with the exceptions that a plurality of linear channels that function as the first gas passage 38a are formed in one of the main surfaces of the laminate composed of the second layers 2 disposed on each of the main surfaces of the first layer 1, and a plurality of linear channels that function as the second gas passage 38b are formed in the other main surface of the laminate. In the fuel cell 30 illustrated in FIG. 3, the first layer in the carbon member 10b functions as the separator main body 31, the second layers function as the separator surface layers 32, and the third layers 3 function as either the first gas diffusion layer 33a or the second gas diffusion layer 33b.

Further, as illustrated in FIG. 3, a carbon member 10c is provided on the outside of each of the two outermost MEAs 34 among the plurality of MEAs 34, and this carbon member 10c functions as a cell member that integrates a separator 37 and a first gas diffusion layer 33a or second gas diffusion layer 33b disposed adjacent to the separator 37 into a single body. The carbon member 10c is the same as the carbon member 10b, with the exceptions that a second layer that functions as the separator surface layer 32 and a third layer that functions as either the first gas diffusion layer 33a or the second gas diffusion layer 33b are formed on only one of the main surfaces of the first layer that functions as the separator main body 31.

There are no particular limitations on the fuel cell of the present invention, with the exception of using the carbon members 10b and 10c of the present invention as cell members, and the types of materials used in conventional fuel cells can be used for members such as the electrolyte membrane.

Further, conventional methods such as methods using a compression molding machine can be used for forming the channels that function as the first gas passage 38a or the second gas passage 38b in the laminate prepared by disposing a second layer 2 on either one surface or both surfaces of the first layer 1.

The fuel cell 30 illustrated in FIG. 3 uses the carbon members 10b and 10c of the present invention as cell members, and therefore excellent productivity and superior power generation characteristics can be achieved.

The carbon member 10 of the present embodiment is obtained by welding, into a single integrated body: a first layer 1 which includes 100 parts by mass of a first resin composition containing a polyolefin-based resin and having a melt flow rate, measured at 230° C. with a load of 2.16 kg, of 0.01 to 10 g/10 min, and 100 to 1,000 parts by mass of a first carbonaceous material; second layers 2 which are disposed in contact with each of the main surfaces of the first layer 1, and include 100 parts by mass of a second resin composition containing a polyolefin-based resin, having an aforementioned melt flow rate of 5 to 1,000 g/10 min that is greater than that of the first resin composition, and having a melting point that is 80° C. or higher, but is at least 10° C. lower than that of the first resin composition, and 100 to 1,000 parts by mass of a second carbonaceous material; and third layers 3 which are disposed facing the first layer 1 with the second layers 2 interposed therebetween, and are formed from a porous carbon material having a bulk density of 60 to 800 kg/m$^3$, and as a result, the effects described below are obtained.

In other words, in the carbon member 10 of the present embodiment, because the second resin composition contained in the second layers 2 has an MFR of 5 to 1,000 g/10 min that is greater than that of the first resin composition, and has a melting point that is 80° C. or higher, but is at least 10° C. lower than that of the first resin composition, the second layers 2 can be welded easily and reliably to the first layer 1, and the second layers 2 can be welded to the third layers 3 formed from the porous carbon material. Consequently, the carbon member 10 becomes a structure in which the entirety of the interfaces between the first layer 1 and the second layers 2 and the entirety of the interfaces between the second layers 2 and the third layers 3 are integrated tightly together, and therefore the resistance in the thickness direction (the penetration resistance) is low, superior conductivity can be achieved, and excellent flexural strength can also be obtained.

Further, in the carbon member 10 of the present embodiment, because the first resin composition contained in the first layer 1 has an MFR of 0.01 to 10 g/10 min, superior flexural strength can be obtained, and a carbon member 10 is obtained that can function as a partition wall that divides the inside of the battery. As a result, when a battery is manufactured using the carbon member 10 as a battery member, excellent workability and processability can be obtained, and the first layer 1 is able to function, for example, as a bipolar plate of a redox flow battery, or as a separator of a fuel cell.

Furthermore, in the carbon member 10 of the present embodiment, the third layers 3 are formed from a porous carbon material having a bulk density of 60 to 800 kg/m$^3$, and are porous materials of excellent conductivity. Accordingly, when a battery is manufactured using the carbon member 10 as a battery member, each of the third layers 3 is able to function, for example, as an electrode of a redox flow battery, or as a gas diffusion layer adjacent to a separator of a fuel cell.

In this manner, the carbon member 10 of the present embodiment can, for example, be used favorably as a battery member that integrates an electrode and a bipolar plate of a redox flow battery into a single body. In this case, the number of battery members can be reduced compared with the case where the redox flow battery is manufactured using a separate electrode and bipolar plate, and therefore the productivity can be improved.

Further, the carbon member 10 of the present embodiment can, for example, also be used favorably as a cell member that integrates a separator of a fuel cell and a gas diffusion layer that is positioned adjacent to the separator into a single body. In this case, the separator of the fuel cell and the gas diffusion layer that is positioned adjacent to the separator can be manufactured easily, and the productivity can be improved.

Furthermore, in the carbon member 10 of the present embodiment, the third layers 3 are formed from a porous carbon material having a bulk density of 60 to 800 kg/m$^3$, the first layer 1 and the second layers 2 contain adequate amounts of the carbonaceous materials, and welding yields a structure in which the entirety of the interfaces between the first layer 1 and the second layers 2 and the entirety of the interfaces between the second layers 2 and the third layers 3 are integrated tightly together, and therefore superior conductivity can be achieved. Accordingly, when a battery is manufactured using the carbon member 10 of the present embodiment as a battery member, a battery having excellent properties can be obtained.

Further, the first layer 1 and the second layers 2 that constitute the carbon member 10 of the present embodiment can be easily manufactured in a continuous manner using a method in which each of the layers is extruded individually, or a method in which the layers are formed by co-extrusion molding, and therefore the productivity is excellent.

The carbon member of the present invention is not limited to the embodiments described above.

For example, in the carbon member 10 illustrated in FIG. 1, the example was described in which a second layer 2 was provided on each of the main surfaces of the first layer 1, but in the carbon member of the present invention, the second layer 2 need only be disposed in contact with at least one of the main surfaces of the first layer. In other words, the carbon member of the present invention may contain a first layer, a second layer disposed in contact with one of the main surfaces of the first layer, and a third layer disposed facing the first layer with the second layer interposed therebetween integrated together into a single body.

EXAMPLES

Examples 1 to 29, Reference Examples 1 and 2, Comparative Examples 1 to 10

Using resin compositions P01 to P15 shown in Table 1, carbonaceous materials C1 to C7 shown in Table 2, and porous carbon materials EL1 to EL8 shown in Table 3, the methods described below were used to manufacture and evaluate carbon members of Example 1 to Example 29, Reference Examples 1 and 2, and Comparative Example 1 to Comparative Example 10 shown in Table 4 to Table 10.

TABLE 1

| | | P01 | P02 | P03 | P04 | P05 | P06 | P07 | P08 | P09 | P10 | P11 |
|---|---|---|---|---|---|---|---|---|---|---|---|---|
| VS200A (homo PP) MFR = 0.5 (230° C.), 2.16 kg | mass % | 95 | | | | | | | | | | |
| PMB60A (block PP) MFR = 63 (230° C.), 2.16 kg | mass % | | | 95 | | | | | | | | |
| PL400A (homo PP) MFR = 2 (230° C.), 2.16 kg | mass % | | 95 | | 100 | | | | | | | |
| PM801A (homo PP) MFR = 13 (230° C.), 2.16 kg | mass % | | | | | | | | | | | 95 |
| PP2228 (PP-based copolymer) MFR = 30 (230° C.), 2.16 kg | mass % | | | | | 100 | | | | | | |

TABLE 1-continued

| | | P1 | P2 | P3 | P4 | P5 | P6 | P7 | P8 | P9 | P10 | P11 |
|---|---|---|---|---|---|---|---|---|---|---|---|---|
| Q100F (PP-based copolymer) MFR = 0.6 (230° C.), 2.16 kg | mass % | | | | | | | 90 | | | | |
| PM940M (random PP) MFR = 30 (230° C.), 2.16 kg | mass % | | | | | 100 | | | | | 70 | 40 |
| PB0800M (polybutene-1) MFR = 820 (230° C.), 2.16 kg | mass % | | | | | | | | 100 | | | |
| DP8510M (polybutene-1) MFR = 168 (230° C.), 2.16 kg | mass % | | | | | | | | | 30 | | |
| HSBR DYNARON 1320P MFR = 3.5 (230° C.), 2.16 kg | mass % | 5 | | 5 | | | | | | | 10 | |
| SEBS KRATON G1652 (MFR = 5 (230° C.), 5 kg) | mass % | | 5 | | | 10 | | | | | | 5 |
| SEBS KRATON G1657 (MFR = 22 (230° C.), 5 kg) | mass % | | | | | | | | | | 5 | |
| Atactic PP EASTOFLEX M-1030S | mass % | | | | | | | | | | 30 | |
| ARKON P-125 tackifier | mass % | | | | | | | | | | 15 | |
| IRGANOX 1330 | (phr) | 0.2 | 0.2 | 0.2 | 0.2 | 0.2 | 0.2 | 0.2 | 0.2 | 0.2 | 0.2 | 0.2 |
| IRGANOX PS802FL | (phr) | 0.1 | 0.1 | 0.1 | 0.1 | 0.1 | 0.1 | 0.1 | 0.1 | 0.1 | 0.1 | 0.1 |
| IRGAFOS 126 | (phr) | 0.2 | 0.2 | 0.2 | 0.2 | 0.2 | 0.2 | 0.2 | 0.2 | 0.2 | 0.2 | 0.2 |
| Calcium stearate | (phr) | 0.1 | 0.1 | 0.1 | 0.1 | 0.1 | 0.1 | 0.1 | 0.1 | 0.1 | 0.1 | 0.1 |
| MFR (230° C., 2.16 kg) | | 0.5 | 1.2 | 58 | 1.9 | 30 | 0.2 | 30 | 820 | 78 | 84 | 9.2 |
| Melting point | | 162 | 157 | 163 | 158 | 136 | 135 | 138 | 127 | 134 | 132 | 162 |

| | | | P12 | P13 | P14 | P15 | |
|---|---|---|---|---|---|---|---|
| VS200A (homo PP) MFR = 0.5 (230° C.), 2.16 kg | | mass % | | 95 | | | manufactured by SunAllomer Ltd. |
| PMB60A (block PP) MFR = 63 (230° C.), 2.16 kg | | mass % | | | | | |
| PL400A (homo PP) MFR = 2 (230° C.), 2.16 kg | | mass % | | | | | |
| PM801A (homo PP) MFR = 13 (230° C.), 2.16 kg | | mass % | | | | | |
| PP2228 (PP-based copolymer) MFR = 30 (230° C.), 2.16 kg | | mass % | | | | | |
| Q100F (PP-based copolymer) MFR = 0.6 (230° C.), 2.16 kg | | mass % | | | | | |
| PM940M (random PP) MFR = 30 (230° C.), 2.16 kg | | mass % | | | 69 | 35 | |
| PB0800M (polybutene-1) MFR = 820 (230° C.), 2.16 kg | | mass % | | | | | |
| DP8510M (polybutene-1) MFR = 168 (230° C.), 2.16 kg | | mass % | 100 | | | | |
| HSBR DYNARON 1320P MFR = 3.5 (230° C.), 2.16 kg | | mass % | | 30 | | 20 | manufactured by JSR Corporation |
| SEBS KRATON G1652 (MFR = 5 (230° C.), 5 kg) | | mass % | | | | | manufactured by |
| SEBS KRATON G1657 (MFR = 22 (230° C.), 5 kg) | | mass % | | | 2 | 10 | Kraton Polymers Inc. |
| Atactic PP EASTOFLEX M-1030S | | mass % | | | 5 | 30 | manufactured by Eastman Chemical Company |
| ARKON P-125 tackifier | | mass % | | | 25 | 5 | manufactured by Arakawa Chemical Industries, Ltd. |
| IRGANOX 1330 | | (phr) | 0.2 | 0.2 | 0.2 | 0.2 | manufactured by |
| IRGANOX PS802FL | | (phr) | 0.1 | 0.1 | 0.1 | 0.1 | BASF Corporation |
| IRGAFOS 126 | | (phr) | 0.2 | 0.2 | 0.2 | 0.2 | |
| Calcium stearate | | (phr) | 0.1 | 0.1 | 0.1 | 0.1 | manufactured by Kawamura Kasei Industry Co., Ltd. |
| MFR (230° C., 2.16 kg) | | | 9.2 | 1.6 | 67 | 98 | |
| Melting point | | | 82 | 158 | 134 | 129 | |

TABLE 2

| | Carbonaceous material | Average fiber diameter (nm) | Fiber length (μm) |
|---|---|---|---|
| C1 | Boron-containing fine graphite powder (boron content: 1.9 mass %) | — | — |
| C2 | Synthetic fine graphite powder | — | — |
| C3 | Natural fine graphite powder | — | — |
| C4 | Carbon fiber | 150 | 10 to 20 |
| C5 | Carbon fiber | 15 | 3 to 5 |
| C6 | Boron-containing fine graphite powder (boron content: 0.03 mass %) | — | — |
| C7 | Boron-containing fine graphite powder (boron content: 3.2 mass %) | — | — |

TABLE 3

| | Porous carbon material | Bulk density (kg/m³) |
|---|---|---|
| EL1 | Average fiber diameter 16 μm | 100 |
| EL2 | Average fiber diameter 160 nm | 100 |
| EL3 | Average fiber diameter 200 nm | 100 |
| EL4 | Average fiber diameter 170 nm (contains boron) | 100 |
| EL5 | Average fiber diameter 16 μm | 5000 |
| EL6 | Average fiber diameter 7 μm | 440 |
| EL7 | Average fiber diameter 16 μm | 620 |
| EL8 | LEP-205 (manufactured by Osaka Gas Chemicals Co., Ltd.) | 100 |

TABLE 4

| <Resin composition> | | | Example 1 | | | Example 2 | | | Example 3 | | | Example 4 | | | Example 5 | | | Example 6 | | |
|---|---|---|---|---|---|---|---|---|---|---|---|---|---|---|---|---|---|---|---|---|
| Type | MFR [g/10 min] | Melting point [° C.] | first layer | second layer | third layer | first layer | second layer | third layer | first layer | second layer | third layer | first layer | second layer | third layer | first layer | second layer | third layer | first layer | second layer | third layer |
| | | | [parts by mass] | | | [parts by mass] | | | [parts by mass] | | | [parts by mass] | | | [parts by mass] | | | [parts by mass] | | |
| P01 | 0.5 | 162 | 100 | | | 100 | | | 100 | | | 100 | | | 100 | | | | | |
| P02 | 1.2 | 157 | | | | | | | | | | | | | | | | 100 | | |
| P03 | 58 | 163 | | | | | | | | | | | | | | | | | | |
| P04 | 1.9 | 158 | | | | | | | | | | | 100 | | | | | | | |
| P05 | 30 | 136 | | | | | | | | 100 | | | | | | | | | | |
| P06 | 30 | 135 | | | | | 100 | | | | | | | | | | | | | |
| P07 | 30 | 138 | | | | | | | | | | | | | | 100 | | | | |
| P08 | 820 | 127 | | 100 | | | | | | | | | | | | | | | | |
| P09 | 78 | 134 | | | | | | | | | | | | | | | | | 100 | |
| P10 | 84 | 132 | | | | | | | | | | | | | | | | | | |
| P11 | 9.2 | 162 | | | | | | | | | | | | | | | | | | |
| P12 | 168 | 82 | | | | | | | | | | | | | | | | | | |
| P13 | 1.6 | 158 | | | | | | | | | | | | | | | | | | |
| P14 | 67 | 134 | | | | | | | | | | | | | | | | | | |
| P15 | 98 | 129 | | | | | | | | | | | | | | | | | | |
| <Carbonaceous material> | | | | | | | | | | | | | | | | | | | | |
| C1 | 1.9 mass % boron-containing fine graphite powder | | 600 | 300 | | 600 | 300 | | 600 | 300 | | | 300 | | | 400 | | | 300 | |
| C2 | Synthetic fine graphite powder | | | | | | | | | | | 600 | | | 600 | | | | | |
| C3 | Natural fine graphite powder | | | | | | | | | | | | | | | | | 560 | | |

TABLE 4-continued

| | | | Example 1 | | | Example 2 | | | Example 3 | | | Example 4 | | | Example 5 | | | Example 6 | | |
|---|---|---|---|---|---|---|---|---|---|---|---|---|---|---|---|---|---|---|---|---|
| <Resin composition> | | | first layer | second layer | third layer | first layer | second layer | third layer | first layer | second layer | third layer | first layer | second layer | third layer | first layer | second layer | third layer | first layer | second layer | third layer |
| Type | MFR [g/10 min] | Melting point [° C.] | [parts by mass] | | | [parts by mass] | | | [parts by mass] | | | [parts by mass] | | | [parts by mass] | | | [parts by mass] | | |
| C4 | | | | 100 | | | 100 | | | 100 | | | 100 | | | | | | | 100 | |
| C5 | | | Carbon fiber | | | | | | | | | | | | | | | 40 | | |
| C6 | | | Carbon fiber 0.03 mass % boron-containing fine graphite powder | | | | | | | | | | | | | | | | | |
| C7 | | | 3.2 mass % boron-containing fine graphite powder | | | | | | | | | | | | | | | | | |
| <Porous carbon material> | | | | | | | | | | | | | | | | | | | | |
| | | EL1 | | | ○ | | | | | | | | | | | | | | | |
| | | EL2 | | | | | | ○ | | | | | | | | | | | | |
| | | EL3 | | | | | | | | | ○ | | | | | | | | | |
| | | EL4 | | | | | | | | | | | | ○ | | | | | | |
| | | EL5 | | | | | | | | | | | | | | | ○ | | | |
| | | EL6 | | | | | | | | | | | | | | | | | | ○ |
| | | EL7 | | | | | | | | | | | | | | | | | | |
| | | EL8 | | | | | | | | | | | | | | | | | | |
| Preliminary mixing | | | yes | yes | | no | no | | yes | yes | | yes | yes | | yes | yes | | yes | yes | |
| Sheet molding | | | extrusion | extrusion | | extrusion | extrusion | | co-extrusion | | | extrusion | extrusion | | extrusion | extrusion | | extrusion | extrusion | |
| Welding operation | | | yes | yes | | yes | yes | | yes | yes | | yes | yes | | yes | yes | | yes | yes | |
| Flexural strength [MPa] | | | 52.3 | | | 47.2 | | | 50.1 | | | 47.6 | | | 46.3 | | | 49.4 | | |
| Flexural strain [%] | | | 1.23 | | | 1.04 | | | 1.12 | | | 1.41 | | | 0.68 | | | 0.72 | | |
| Penetration resistance [mΩcm²] | | | 24 | | | 25 | | | 22 | | | 32 | | | 34 | | | 23 | | |
| Weldability | | | ○ | | | ○ | | | ○ | | | ○ | | | ○ | | | ○ | | |

TABLE 5

| | | | Example 7 | | | Example 8 | | | Example 9 | | | Example 10 | | | Example 11 | | | Example 12 | | |
|---|---|---|---|---|---|---|---|---|---|---|---|---|---|---|---|---|---|---|---|---|
| <Resin composition> | | | first layer | second layer | third layer | first layer | second layer | third layer | first layer | second layer | third layer | first layer | second layer | third layer | first layer | second layer | third layer | first layer | second layer | third layer |
| Type | MFR [g/10 min] | Melting point [° C.] | [parts by mass] | | | [parts by mass] | | | [parts by mass] | | | [parts by mass] | | | [parts by mass] | | | [parts by mass] | | |
| P01 | 0.5 | 162 | 100 | | | 100 | | | 100 | | | 100 | | | | | | 100 | | |
| P02 | 1.2 | 157 | | | | | | | | | | | | | | | | | | |
| P03 | 58 | 163 | | | | | | | | | | | | | | | | | | |
| P04 | 1.9 | 158 | | | | | | | | | | | | | 100 | | | | | |
| P05 | 30 | 136 | | | | | | | | | | | | | | | | | | |
| P06 | 0.2 | 135 | | | | | | | | | | | | | | | | | | |
| P07 | 30 | 138 | | | | | | | | | | | | | | | | | | |
| P08 | 820 | 127 | | | | | | | | | | | | | | 100 | | | | |
| P09 | 78 | 134 | | | | | | | | | | | 100 | | | | | | | |
| P10 | 84 | 132 | | 100 | | | 100 | | | 100 | | | | | | | | | | |
| P11 | 9.2 | 162 | | | | | | | | | | | | | | | | | | |
| P12 | 168 | 82 | | | | | | | | | | | | | | | | | 100 | |
| P13 | 1.6 | 158 | | | | | | | | | | | | | | | | | | |
| P14 | 67 | 134 | | | | | | | | | | | | | | | | | | |
| P15 | 98 | 129 | | | | | | | | | | | | | | | | | | |
| <Carbonaceous material> | | | | | | | | | | | | | | | | | | | | |
| C1 | 1.9 mass % boron-containing fine graphite powder | | 600 | 300 | | 600 | 300 | | 600 | 300 | | 600 | 400 | | 600 | 400 | | 600 | 300 | |
| C2 | Synthetic fine graphite powder | | | | | | | | | | | | | | | | | | | |
| C3 | Natural fine graphite powder | | | | | | | | | | | | | | | | | | | |

TABLE 5-continued

| | | | Example 7 | | | Example 8 | | | Example 9 | | | Example 10 | | | Example 11 | | | Example 12 | | |
|---|---|---|---|---|---|---|---|---|---|---|---|---|---|---|---|---|---|---|---|---|
| | | | first layer | second layer | third layer | first layer | second layer | third layer | first layer | second layer | third layer | first layer | second layer | third layer | first layer | second layer | third layer | first layer | second layer | third layer |
| <Resin composition> | | | [parts by mass] | | | [parts by mass] | | | [parts by mass] | | | [parts by mass] | | | [parts by mass] | | | [parts by mass] | | |
| Type | MFR [g/10 min] | Melting point [°C] | | | | | | | | | | | | | | | | | | |
| C4 | | | | 50 | | | 50 | | | 50 | | | | | | | | | 50 | |
| C5 | | | | 50 | | | 50 | | | 50 | | | | | | | | | 50 | |
| C6 | | | boron-containing fine graphite powder 0.03 mass % | | | | | | | | | | | | | | | | | |
| C7 | | | boron-containing fine graphite powder 3.2 mass % | | | | | | | | | | | | | | | | | |
| <Porous carbon material> | | | | | | | | | | | | | | | | | | | | |
| EL1 | | | | | | | | | | | | | | | | | | | | |
| EL2 | | | | | | | | | | | | | | | | | | | | |
| EL3 | | | | | ○ | | | | | | | | | | | | | | | |
| EL4 | | | | | | | | ○ | | | | | | | | | | | | |
| EL5 | | | | | | | | | | | ○ | | | | | | | | | |
| EL6 | | | | | | | | | | | | | | ○ | | | | | | |
| EL7 | | | | | | | | | | | | | | | | | ○ | | | |
| EL8 | | | | | | | | | | | | | | | | | | | | ○ |
| Preliminary mixing | | | yes | yes | | yes | yes | | yes | yes | | yes | yes | | yes | yes | | yes | yes | |
| Sheet molding | | | extrusion | extrusion | | extrusion | extrusion | | extrusion | extrusion | | extrusion | extrusion | | extrusion | extrusion | | extrusion | extrusion | |
| Welding operation | | | | yes | | | yes | | | yes | | | yes | | | yes | | | yes | |
| Flexural strength [MPa] | | | | 50.3 | | | 49.8 | | | 49.7 | | | 53.1 | | | 50.5 | | | 49.4 | |
| Flexural strain [%] | | | | 1.43 | | | 1.39 | | | 1.42 | | | 1.03 | | | 1.14 | | | 1.39 | |
| Penetration resistance [mΩcm²] | | | | 20 | | | 16 | | | 18 | | | 25 | | | 22 | | | 14 | |
| Weldability | | | | ○ | | | ○ | | | ○ | | | ○ | | | ○ | | | ○ | |

TABLE 6

| | | | Example 13 | | | Example 14 | | | Example 15 | | | Example 16 | | | Example 17 | | | Example 18 | | |
|---|---|---|---|---|---|---|---|---|---|---|---|---|---|---|---|---|---|---|---|---|
| <Resin composition> | | | first layer | second layer | third layer | first layer | second layer | third layer | first layer | second layer | third layer | first layer | second layer | third layer | first layer | second layer | third layer | first layer | second layer | third layer |
| Type | MFR [g/10 min] | Melting point [° C.] | [parts by mass] | | | [parts by mass] | | | [parts by mass] | | | [parts by mass] | | | [parts by mass] | | | [parts by mass] | | |
| P01 | 0.5 | 162 | | | | 100 | | | 100 | | | 100 | | | 100 | | | 100 | | |
| P02 | 1.2 | 157 | | | | | | | | | | | | | | | | | | |
| P03 | 58 | 163 | | | | | | | | | | | | | | | | | | |
| P04 | 1.9 | 158 | | | | | | | | | | | | | | | | | | |
| P05 | 30 | 136 | | | | | | | | | | | | | | | | | | |
| P06 | 0.2 | 135 | | | | | | | | | | | | | | | | | | |
| P07 | 30 | 138 | | | | | | | | | | | | | | | | | | |
| P08 | 820 | 127 | | | | | | | | | | | | | | | | | | |
| P09 | 78 | 134 | | | | | | | | | | | | | | | | | | |
| P10 | 84 | 132 | | | | | | | | 100 | | | 100 | | | | | | | | |
| P11 | 9.2 | 162 | 100 | | | | | | | | | | | | | | | | | |
| P12 | 168 | 82 | | | | | | | | | | | | | | | | | | 100 | |
| P13 | 1.6 | 158 | | 100 | | | 100 | | | | | | | | | 100 | | | | |
| P14 | 67 | 134 | | | | | | | | | | | | | | | | | | | |
| P15 | 98 | 129 | | | | | | | | | | | | | | | | | | | |
| <Carbonaceous material> | | | | | | | | | | | | | | | | | | | | |
| C1 | 1.9 mass % boron-containing fine graphite powder | | 600 | 300 | | 200 | 300 | | 900 | 300 | | 600 | 100 | | 600 | 700 | | 600 | 300 | |
| C2 | Synthetic fine graphite powder | | | | | | | | | | | | | | | | | | | | |
| C3 | Natural fine graphite powder | | | | | | | | | | | | | | | | | | | | |

TABLE 6-continued

| <Resin composition> | | Example 13 | | | Example 14 | | | Example 15 | | | Example 16 | | | Example 17 | | | Example 18 | | |
|---|---|---|---|---|---|---|---|---|---|---|---|---|---|---|---|---|---|---|---|
| | | first layer | second layer | third layer | first layer | second layer | third layer | first layer | second layer | third layer | first layer | second layer | third layer | first layer | second layer | third layer | first layer | second layer | third layer |
| Type | MFR [g/10 min] | Melting point [° C.] | [parts by mass] | | [parts by mass] | | | [parts by mass] | | | [parts by mass] | | | [parts by mass] | | | [parts by mass] | | |
| C4 | Carbon fiber | | | | | | | | | | | | | | | | | | |
| C5 | Carbon fiber | | | | | | | | | | | | | | | | | | |
| C6 | 0.03 mass % boron-containing fine graphite powder | | | | | | | | | | | | | | | | | | |
| C7 | 3.2 mass % boron-containing fine graphite powder | | 100 | | | 100 | | | 100 | | | 100 | | | 100 | | | 100 | |
| <Porous carbon material> | | | | | | | | | | | | | | | | | | | |
| EL1 | | | | ○ | | | | | | | | | | | | | | | |
| EL2 | | | | | | | ○ | | | | | | | | | | | | |
| EL3 | | | | | | | | | | ○ | | | | | | | | | |
| EL4 | | | | | | | | | | | | | | ○ | | | | | |
| EL5 | | | | | | | | | | | | | ○ | | | | | | |
| EL6 | | | | | | | | | | | | | | | | | | | ○ |
| EL7 | | | | | | | | | | | | | | | | | | | |
| EL8 | | | | | | | | | | | | | | | | | | | |
| Preliminary mixing | | yes | yes | | yes | yes | | yes | yes | | yes | yes | | yes | yes | | yes | yes | |
| Sheet molding | | extrusion | extrusion | | extrusion | extrusion | | extrusion | extrusion | | extrusion | extrusion | | extrusion | extrusion | | extrusion | extrusion | |
| Welding operation | | | yes | | | yes | | | yes | | | yes | | | yes | | | yes | |
| Flexural strength [MPa] | | | 46.1 | | | 64.3 | | | 48.5 | | | 51.7 | | | 47.2 | | | 50.5 | |
| Flexural strain [%] | | | 1.29 | | | 2.42 | | | 0.89 | | | 1.45 | | | 1.14 | | | 1.31 | |
| Penetration resistance [mΩcm²] | | | 21 | | | 41 | | | 11 | | | 32 | | | 8.7 | | | 19 | |
| Weldability | | | ○ | | | ○ | | | ○ | | | ○ | | | ○ | | | ○ | |

TABLE 7

| | | | Example 19 | | | Example 20 | | | Example 21 | | | Example 22 | | | Example 23 | | | Example 24 | | |
|---|---|---|---|---|---|---|---|---|---|---|---|---|---|---|---|---|---|---|---|---|
| <Resin composition> | | | first layer | second layer | third layer | first layer | second layer | third layer | first layer | second layer | third layer | first layer | second layer | third layer | first layer | second layer | third layer | first layer | second layer | third layer |
| Type | MFR [g/10 min] | Melting point [° C.] | [parts by mass] | | | [parts by mass] | | | [parts by mass] | | | [parts by mass] | | | [parts by mass] | | | [parts by mass] | | |
| P01 | 0.5 | 162 | 100 | | | 100 | | | 100 | | | 100 | | | 100 | | | 100 | | |
| P02 | 1.2 | 157 | | | | | | | | | | | | | | | | | | |
| P03 | 58 | 163 | | | | | | | | | | | | | | | | | | |
| P04 | 1.9 | 158 | | 100 | | | | | | | | | | | | | | | | |
| P05 | 30 | 136 | | | | | 100 | | | 100 | | | 100 | | | 100 | | | 100 | |
| P06 | 0.2 | 135 | | | | | | | | | | | | | | | | | | |
| P07 | 30 | 138 | | | | | | | | | | | | | | | | | | |
| P08 | 820 | 127 | | | | | | | | | | | | | | | | | | |
| P09 | 78 | 134 | | | | | | | | | | | | | | | | | | |
| P10 | 84 | 132 | | | | | | | | | | | | | | | | | | |
| P11 | 9.2 | 162 | | | | | | | | | | | | | | | | | | |
| P12 | 168 | 82 | | | | | | | | | | | | | | | | | | |
| P13 | 1.6 | 158 | | | | | | | | | | | | | | | | | | |
| P14 | 67 | 134 | | | | | | | | | | | | | | | | | | |
| P15 | 98 | 129 | | | | | | | | | | | | | | | | | | |
| <Carbonaceous material> | | | | | | | | | | | | | | | | | | | | |
| C1 | 1.9 mass % boron-containing fine graphite powder | | 600 | 300 | | 600 | 300 | | 600 | 300 | | 600 | 200 | | | 300 | | | 300 | |
| C2 | Synthetic fine graphite powder | | | | | | | | | | | | | | | | | | | |
| C3 | Natural fine graphite powder | | | | | | | | | | | | | | | | | | | |

TABLE 7-continued

| <Resin composition> | | Melting point [° C.] | MFR [g/10 min] | Example 19 first layer [parts by mass] | Example 19 second layer [parts by mass] | Example 19 third layer [parts by mass] | Example 20 first layer [parts by mass] | Example 20 second layer [parts by mass] | Example 20 third layer [parts by mass] | Example 21 first layer [parts by mass] | Example 21 second layer [parts by mass] | Example 21 third layer [parts by mass] | Example 22 first layer [parts by mass] | Example 22 second layer [parts by mass] | Example 22 third layer [parts by mass] | Example 23 first layer [parts by mass] | Example 23 second layer [parts by mass] | Example 23 third layer [parts by mass] | Example 24 first layer [parts by mass] | Example 24 second layer [parts by mass] | Example 24 third layer [parts by mass] |
|---|---|---|---|---|---|---|---|---|---|---|---|---|---|---|---|---|---|---|---|---|---|
| Type | | | | | | | | | | | | | | | | | | | | | |
| C4 | Carbon fiber | | | | 100 | | | 100 | | | 10 | | | 100 | | | 100 | | | 100 | |
| C5 | Carbon fiber | | | | | | | | | | | | | | 100 | | | | | | |
| C6 | 0.03 mass % boron-containing fine graphite powder | | | | | | | | | | | | | | | 600 | | | | | |
| C7 | 3.2 mass % boron-containing fine graphite powder | | | | | | | | | | | | | | | | | | 600 | | |
| <Porous carbon material> | | | | | | | | | | | | | | | | | | | | | |
| EL1 | | | | | | | | | | | | | | | | | | | | | |
| EL2 | | | | | | | | | | | | | | | | | | | | | |
| EL3 | | | | | | | | | | | | | | | | | | | | | |
| EL4 | | | | | | | | | | | | | | | | | | | | | |
| EL5 | | | | | | | | | | | | | | | | | | | | | |
| EL6 | | | | | | ○ | | | | | | | | | | | | | | | |
| EL7 | | | | | | | | | ○ | | | | | | | | | | | | |
| EL8 | | | | | | | | | | | | ○ | | | ○ | | | ○ | | ○ | |
| Preliminary mixing | | | | yes | | | yes | yes | | yes | yes | | yes | yes | | yes | yes | | yes | yes | |
| Sheet molding | | | | extrusion | | | extrusion | extrusion | | extrusion | extrusion | | extrusion | extrusion | | extrusion | extrusion | | extrusion | extrusion | |
| Welding operation | | | | yes | | | yes | | | yes | | | yes | | | yes | | | yes | | |
| Flexural strength [MPa] | | | | 51.6 | | | 52.4 | | | 52.7 | | | 54.7 | | | 52.2 | | | 50.9 | | |
| Flexural strain [%] | | | | 1.16 | | | 1.18 | | | 1.21 | | | 1.32 | | | 1.19 | | | 1.15 | | |
| Penetration resistance [mΩcm²] | | | | 18 | | | 16 | | | 19 | | | 12 | | | 28 | | | 31 | | |
| Weldability | | | | ○ | | | ○ | | | ○ | | | ○ | | | ○ | | | ○ | | |

TABLE 8

| | | | Example 25 | | | Example 26 | | | Example 27 | | | Example 28 | | | Example 29 | | | Reference Example 1 | | | Reference Example 2 | | |
|---|---|---|---|---|---|---|---|---|---|---|---|---|---|---|---|---|---|---|---|---|---|---|---|
| | | | first layer | second layer | third layer | first layer | second layer | third layer | first layer | second layer | third layer | first layer | second layer | third layer | first layer | second layer | third layer | first layer | second layer | third layer | first layer | second layer | third layer |
| | MFR | Melting point | [parts by mass] | | | [parts by mass] | | | [parts by mass] | | | [parts by mass] | | | [parts by mass] | | | [parts by mass] | | | [parts by mass] | | |
| Type | [g/10 min] | [° C.] | | | | | | | | | | | | | | | | | | | | | |
| <Resin composition> | | | | | | | | | | | | | | | | | | | | | | | |
| P01 | 0.5 | 162 | | | | 100 | | | 100 | | | 100 | | | 100 | | | 100 | | | 100 | | |
| P02 | 1.2 | 157 | | | | | | | | | | | | | | | | | | | | | |
| P03 | 58 | 163 | | | | | | | | | | | | | | | | | | | | | |
| P04 | 1.9 | 158 | | | | | | | | | | | | | | | | | | | | | |
| P05 | 30 | 136 | | | | | | | | | | | | | | | | | | | | | |
| P06 | 0.2 | 135 | | | | | | | | | | | | | | | | | | | | | |
| P07 | 30 | 138 | | | | | | | | | | | | | | | | | | | | | |
| P08 | 820 | 127 | | 100 | | | | | | | | | | | | | | | | | | 100 | |
| P09 | 78 | 134 | | | | | | | | | | | 100 | | | 100 | | | 100 | | | | |
| P10 | 84 | 132 | | | | | | | | | | | | | | | | | | | | | | |
| P11 | 9.2 | 162 | | | | | | | | 100 | | | | | | | | | | | | | |
| P12 | 168 | 82 | 100 | | | | | | | | | | | | | | | | | | | | |
| P13 | 1.6 | 158 | | | | | 100 | | | | | | | | | | | | | | | | |
| P14 | 67 | 134 | | | | | | | | | | | | | | | | | | | | | | |
| P15 | 98 | 129 | | | | | | | | | | | | | | | | | | | | | | |
| <Carbonaceous material> | | | | | | | | | | | | | | | | | | | | | | | |
| C1 1.9 mass % boron-containing fine graphite powder | | | 600 | 300 | | 600 | 300 | | 600 | 300 | | 600 | 300 | | | | | 600 | 300 | | 600 | 300 | |
| C2 Synthetic fine graphite powder | | | | | | | | | | | | | | | 600 | | | | | | | | |
| C3 Natural fine graphite powder | | | | | | | | | | | | | | | | | | | | | | | |

TABLE 8-continued

| | | | Example 25 | | | Example 26 | | | Example 27 | | | Example 28 | | | Example 29 | | | Reference Example 1 | | | Reference Example 2 | | |
|---|---|---|---|---|---|---|---|---|---|---|---|---|---|---|---|---|---|---|---|---|---|---|---|
| | | | first layer | second layer | third layer | first layer | second layer | third layer | first layer | second layer | third layer | first layer | second layer | third layer | first layer | second layer | third layer | first layer | second layer | third layer | first layer | second layer | third layer |
| <Resin composition> | | | [parts by mass] | | | [parts by mass] | | | [parts by mass] | | | [parts by mass] | | | [parts by mass] | | | [parts by mass] | | | [parts by mass] | | |
| Type | MFR [g/10 min] | Melting point [° C.] | | | | | | | | | | | | | | | | | | | | | |
| C4 | | | | 100 | | | 50 | | | 50 | | | 100 | | | 100 | | | 100 | | | 100 | |
| C5 | | | | | | | 50 | | | 50 | | | | | | | | | | | | | | |
| C6 | | | boron-containing fine graphite powder 0.03 mass % | | | | | | | | | | | | | | | | | | | | |
| C7 | | | boron-containing fine graphite powder 3.2 mass % | | | | | | | | | | | | | | | | | | | | |
| <Porous carbon material> | | | | | | | | | | | | | | | | | | | | | | | | |
| EL1 | | | | | | | | | | | | | | | | | | | | | | | |
| EL2 | | | | | | | | | | | | | | | | | | | | | | | |
| EL3 | | | | | | ○ | | | | | | | | | | | | | | | | | | |
| EL4 | | | | | | | | | ○ | | | | | | | | | | | | | | | |
| EL5 | | | | | | | | | | | | ○ | | | | | | | | | | | | |
| EL6 | | | | | | | | | | | | | | | ○ | | | | | | | | | |
| EL7 | | | | | | | | | | | | | | | | | | ○ | | | | | | |
| EL8 | | | | | | | | | | | | | | | | | | | | | ○ | | | |
| Preliminary mixing | | | | | | | | | | | | | | | | | | | | | | | | |
| Sheet molding | | | extrusion | yes extrusion | yes | extrusion | yes extrusion | yes | extrusion | yes extrusion | yes | extrusion | yes extrusion | yes | extrusion | yes extrusion | yes | extrusion | yes extrusion | yes | extrusion | yes extrusion | yes |
| Welding operation | | | | yes | | | yes | | | yes | | | yes | | | yes | | | no | | | no | |
| Flexural strength [MPa] | | | | 44.6 | | | 50.2 | | | 47.1 | | | 52.4 | | | 52.6 | | | 50.1 | | | 50.1 | |
| Flexural strain [%] | | | | 2.07 | | | 1.42 | | | 1.45 | | | 1.21 | | | 1.22 | | | 1.13 | | | 1.13 | |
| Penetration resistance [mΩcm²] | | | | 17 | | | 15 | | | 12 | | | 36 | | | 38 | | | 187 | | | 258 | |
| Weldability | | | | ○ | | | ○ | | | ○ | | | ○ | | | ○ | | | — | | | — | |

TABLE 9

| <Resin composition> | | | | Comparative Example 1 | | | Comparative Example 2 | | | Comparative Example 3 | | |
|---|---|---|---|---|---|---|---|---|---|---|---|---|
| Type | | MFR [g/10 min] | Melting point [° C.] | first layer | second layer | third layer | first layer | second layer | third layer | first layer | second layer | third layer |
| | | | | [parts by mass] | | | [parts by mass] | | | [parts by mass] | | |
| P01 | | 0.5 | 162 | 100 | | | 100 | | | 100 | | |
| P02 | | 1.2 | 157 | | | | | | | | | |
| P03 | | 58 | 163 | | | | | | | | | |
| P04 | | 1.9 | 158 | | | | | | | | | |
| P05 | | 30 | 136 | | | | | | | | | |
| P06 | | 0.2 | 135 | | | | | | | | 100 | |
| P07 | | 30 | 138 | | | | | | | | | |
| P08 | | 820 | 127 | | | | | 100 | | | | |
| P09 | | 78 | 134 | | | | | | | | | |
| P10 | | 84 | 132 | | | | | | | | | |
| <Carbonaceous material> | | | | | | | | | | | | |
| C1 | Boron-containing fine graphite powder | | | 600 | | | 600 | 300 | | 600 | 300 | |
| C2 | Synthetic fine graphite powder | | | | | | | | | | | |
| C3 | Natural fine graphite powder | | | | | | | | | | | |
| C4 | Carbon fiber | | | | | | | | 100 | | | 100 |
| C5 | Carbon fiber | | | | | | | | | | | |
| <Porous carbon material> | | | | | | | | | | | | |
| EL1 | | | | ◯ | | | ◯ | | | ◯ | | |
| EL2 | | | | | | | | | | | | |
| EL3 | | | | | | | | | | | | |
| Preliminary mixing | | | | yes | | | yes | yes | | yes | yes | |
| Sheet molding | | | | extrusion | | | press | press | | extrusion | extrusion | |
| Welding operation | | | | no | | | no | | | yes | | |
| Flexural strength | [MPa] | | | 51.3 | | | — | | | 50.4 | | |
| Flexural strain | [%] | | | 1.17 | | | — | | | 1.12 | | |
| Penetration resistance | [mΩcm²] | | | 325 | | | 684 | | | 86 | | |
| Weldability | | | | — | | | — | | | Δ | | |

| <Resin composition> | | | | Comparative Example 4 | | | Comparative Example 5 | | |
|---|---|---|---|---|---|---|---|---|---|
| Type | | MFR [g/10 min] | Melting point [° C.] | first layer | second layer | third layer | first layer | second layer | third layer |
| | | | | [parts by mass] | | | [parts by mass] | | |
| P01 | | 0.5 | 162 | | | | 100 | | |
| P02 | | 1.2 | 157 | | | | | | |
| P03 | | 58 | 163 | 100 | | | | | |
| P04 | | 1.9 | 158 | | | | | | |
| P05 | | 30 | 136 | | | | | 100 | |
| P06 | | 0.2 | 135 | | | | | | |
| P07 | | 30 | 138 | | | | | | |
| P08 | | 820 | 127 | | 100 | | | | |
| P09 | | 78 | 134 | | | | | | |
| P10 | | 84 | 132 | | | | | | |
| <Carbonaceous material> | | | | | | | | | |
| C1 | Boron-containing fine graphite powder | | | 600 | 300 | | 300 | | |
| C2 | Synthetic fine graphite powder | | | | | | | 600 | |
| C3 | Natural fine graphite powder | | | | | | | | |
| C4 | Carbon fiber | | | | | 100 | | | 100 |
| C5 | Carbon fiber | | | | | | | | |
| <Porous carbon material> | | | | | | | | | |
| EL1 | | | | | ◯ | | | ◯ | |
| EL2 | | | | | | | | | |
| EL3 | | | | | | | | | |

TABLE 9-continued

|  |  |  |  |  |  |
|---|---|---|---|---|---|
| Preliminary mixing |  | yes | yes | yes | yes |
| Sheet molding |  | extrusion | extrusion | extrusion | extrusion |
| Welding operation |  |  | yes |  | yes |
| Flexural strength | [MPa] |  | 39.3 |  | 40.4 |
| Flexural strain | [%] |  | 0.76 |  | 0.87 |
| Penetration resistance | [mΩcm²] |  | 35 |  | 120 |
| Weldability |  |  | ○ |  | Δ |

TABLE 10

|  |  |  |  | Comparative Example 6 | | | Comparative Example 7 | | | Comparative Example 8 | | |
|---|---|---|---|---|---|---|---|---|---|---|---|---|
| <Resin composition> | | | | first | second | third | first | second | third | first | second | third |
| Type | MFR [g/10 min] | Melting point [° C.] | | layer [parts by mass] | layer | layer | layer [parts by mass] | layer | layer | layer [parts by mass] | layer | layer |
| P01 | 0.5 | 162 | | 100 | | | | | | | | |
| P02 | 1.2 | 157 | | | | | | | | | 100 | |
| P03 | 58 | 163 | | | 100 | | | 100 | | | | |
| P04 | 1.9 | 158 | | | | | | | | | | |
| P05 | 30 | 136 | | | | | | | | | | |
| P06 | 0.2 | 135 | | | | | 100 | | | | | |
| P07 | 30 | 138 | | | | | | | | | | |
| P08 | 820 | 127 | | | | | | | | | | |
| P09 | 78 | 134 | | | | | | | | | | |
| P10 | 84 | 132 | | | | | | | | | | |
| <Carbonaceous material> | | | | | | | | | | | | |
| C1 | Boron-containing fine graphite powder | | | | 400 | | | 400 | | | | |
| C2 | Synthetic fine graphite powder | | | | | | | | | | | |
| C3 | Natural fine graphite powder | | | | 600 | | | 600 | | | 560 | |
| C4 | Carbon fiber | | | | | | | | | | | |
| C5 | Carbon fiber | | | | | | | | | | 40 | |
| <Porous carbon material> | | | | | | | | | | | | |
| EL1 | | | | | ○ | | | ○ | | | ○ | |
| EL2 | | | | | | | | | | | | |
| EL3 | | | | | | | | | | | | |
| Preliminary mixing | | | | yes | yes | | yes | yes | | yes | yes | |
| Sheet molding | | | | extrusion | extrusion | | extrusion | extrusion | | extrusion | extrusion | |
| Welding operation | | | | | yes | | | yes | | | yes | |
| Flexural strength | [MPa] | | | | 51.8 | | | 47.3 | | | 42.2 | |
| Flexural strain | [%] | | | | 0.74 | | | 0.83 | | | 0.66 | |
| Penetration resistance | [mΩcm²] | | | | 145 | | | 152 | | | 298 | |
| Weldability | | | | | Δ | | | Δ | | | X | |

|  |  |  |  | Comparative Example 9 | | | Comparative Example 10 | | |
|---|---|---|---|---|---|---|---|---|---|
| <Resin composition> | | | | first | second | third | first | second | third |
| Type | MFR [g/10 min] | Melting point [° C.] | | layer [parts by mass] | layer | layer | layer [parts by mass] | layer | layer |
| P01 | 0.5 | 162 | | 100 | | | 100 | | |
| P02 | 1.2 | 157 | | | | | | | |
| P03 | 58 | 163 | | | | | | | |
| P04 | 1.9 | 158 | | | | | | | |
| P05 | 30 | 136 | | | | | | | |
| P06 | 0.2 | 135 | | | | | | | |
| P07 | 30 | 138 | | | | | | | |
| P08 | 820 | 127 | | | 100 | | | 100 | |
| P09 | 78 | 134 | | | | | | | |
| P10 | 84 | 132 | | | | | | | |
| <Carbonaceous material> | | | | | | | | | |
| C1 | Boron-containing fine graphite powder | | | 1200 | 300 | | 600 | 1000 | |
| C2 | Synthetic fine graphite powder | | | | | | | | |
| C3 | Natural fine graphite powder | | | | | | | | |
| C4 | Carbon fiber | | | | 100 | | | 100 | |
| C5 | Carbon fiber | | | | | | | | |

TABLE 10-continued

| <Porous carbon material> | | | | | |
|---|---|---|---|---|---|
| EL1 | | | | | |
| EL2 | | | | | |
| EL3 | | | ○ | | ○ |
| Preliminary mixing | | yes | yes | yes | yes |
| Sheet molding | | extrusion | extrusion | extrusion | extrusion |
| Welding operation | | | yes | | yes |
| Flexural strength | [MPa] | | 39.8 | | 45.4 |
| Flexural strain | [%] | | 0.47 | | 0.87 |
| Penetration resistance | [mΩcm$^2$] | | 25 | | 94 |
| Weldability | | | ○ | | X |

(Resin Compositions P01 to P15)

Each of the resin compositions P01 to P15 shown in Table 1 was produced by using a kneader to mix and knead (compound) all of the raw materials for the resin composition in the ratio shown in Table 1. The melt flow rate and the melting point of each of the thus obtained resin compositions are shown in Table 1.

The raw materials used in the production of the resin compositions P01 to P15 are described below.

Propylene homopolymer-1: manufactured by SunAllomer Ltd., product name: VS200A

Propylene homopolymer-2: manufactured by SunAllomer Ltd., product name: PL400A

Propylene homopolymer-3: manufactured by SunAllomer Ltd., product name: PM801A

Ethylene-propylene copolymer (block PP)-1: manufactured by SunAllomer Ltd., product name: PMB60A Ethylene-propylene copolymer (block PP)-2: manufactured by SunAllomer Ltd., product name: Qualia (a registered trademark) PP2228

Ethylene-propylene copolymer (block PP)-3: product name: Catalloy Adflex (a registered trademark) Q100F Ethylene-propylene copolymer (random PP): manufactured by SunAllomer Ltd., product name: PM940M Polybutene-1: manufactured by SunAllomer Ltd., product name: PB0800M Ethylene-butene-1 copolymer: manufactured by SunAllomer Ltd., product name: DP8510M Hydrogenated styrene-butadiene rubber: manufactured by JSR Corporation, product name: DYNARON 1320P Styrene-ethylene/butylene-styrene block copolymer-1: manufactured by Kraton Polymers Inc., product name: KRATON G1652

Styrene-ethylene/butylene-styrene block copolymer-2: manufactured by Kraton Polymers Inc., product name: KRATON G1657

Atactic polypropylene: manufactured by Eastman Chemical Company, product name: EASTOFLEX M-1030S Alicyclic saturated hydrocarbon resin: manufactured by Arakawa Chemical Industries, Ltd., product name: ARKON P-125

Antioxidant: manufactured by BASF Corporation, IRGANOX (a registered trademark) 1330

Heat stabilizer: manufactured by BASF Corporation, IRGANOX PS802FL

Secondary antioxidant: manufactured by BASF Corporation, IRGAFOS (a registered trademark) 126

Lubricant: Calcium Stearate (Carbonaceous Materials C1 to C7)

[C1: Boron (1.9 Mass %)-Containing Fine Graphite Powder]

Non-needle coke (manufactured by MC Carbon Co., Ltd., product name: MC Coke) was ground coarsely to a particle size of not more than 2 mm to 3 mm using a pulverizer (manufactured by Hosokawa Micron Ltd.). Subsequently, the coarsely ground coke was ground finely in a jet mill (IDS2UR, manufactured by Nippon Pneumatic Mfg. Co., Ltd.) and then classified to prepare a powder having a particle size of 24 µm.

The finely ground coke was then subjected to air flow classification using a turbo classifier (TC15N, manufactured by Nisshin Engineering Inc.), and particles of 5 µm or smaller were removed. To the 14.4 kg of the thus obtained coke was added 0.6 kg of boron carbide ($B_4C$), and the two components were mixed in a Henschel mixer (a registered trademark) at 800 rpm for 5 minutes.

The resulting mixture was placed in a lidded graphite crucible having an internal diameter of 40 cm and a capacity of 40 liters, the crucible was placed in a graphitization furnace that used a graphite heater, graphitization was performed under an argon atmosphere at a temperature of 2,900° C., and the graphitized product was then cooled. As a result, 14 kg of a fine graphite powder was obtained. The thus obtained fine graphite powder had an average particle size of 20.5 µm and a B content of 1.9 mass %. In this manner, a boron-containing fine graphite powder (C1) was obtained.

[C2: Synthetic Fine Graphite Powder]

A synthetic graphite powder Shocaraiser S manufactured by Showa Denko K.K. was finely ground in a jet mill (IDS2UR, manufactured by Nippon Pneumatic Mfg. Co., Ltd.). Subsequently, the particles were classified to regulate the particle size, and air flow classification was then performed using a turbo classifier (TC15N, manufactured by Nisshin Engineering Inc.), thereby removing particles of 5 µm or smaller and obtaining a synthetic fine graphite powder (C2) having an average particle size of 23 µm.

[C3: Natural Fine Graphite Powder]

A product SG18-0.95 manufactured by BTR Energy Materials Co., Ltd. (average particle size: 19 µm) was used.

[C4: Carbon Fiber]

A gas phase method carbon fiber (manufactured by Showa Denko K.K., product name: VGCF (a registered trademark)-H (average fiber diameter: 0.15 µm, fiber length 10 to 20 µm)) was used.

[C5: Carbon Fiber]

A gas phase method carbon fiber (manufactured by Showa Denko K.K., product name: VGCF-X (average fiber diameter: 0.015 µm, fiber length 3 to 5 µm)) was used.

[C6: Boron (0.03 Mass %)-containing Fine Graphite Powder]

With the exception of adding 9.5 g (0.0095 kg) of boron carbide ($B_4C$), a fine graphite powder was obtained using the same method as C1. The thus obtained fine graphite powder had an average particle size of 20.5 µm and a B content of 0.03 mass %.

[C7: Boron (3.2 Mass %)-containing Fine Graphite Powder]

With the exception of adding 1.01 kg of boron carbide ($B_4C$), a fine graphite powder was obtained using the same method as C1. The thus obtained fine graphite powder had an average particle size of 20.5 µm and a B content of 3.2 mass %.

(Porous Carbon Materials EL1 to EL8)

[EL1]

Short fibers (length: about 70 mm) of a flame-resistant fiber obtained by subjecting polyacrylonitrile resin fibers with an average fiber diameter of 16 µm to a flame resistance treatment in air at 200 to 300° C. were felted to prepare a non-woven fabric having a weight per unit area of 500 g/m² and a thickness of 5.0 mm.

The non-woven fabric was heated in a nitrogen gas atmosphere to 1,000° C. at a rate of temperature increase of 100° C./minute, the atmosphere was then changed to an argon gas atmosphere and the temperature was increased to 1,800° C., and the non-woven fabric was then carbonized by holding that temperature for one hour, before being cooled. Subsequently, the carbonized non-woven fabric was subjected to a heat treatment at 600° C. for 20 minutes in a nitrogen gas atmosphere containing 7% of oxygen, thus obtaining a porous carbon material (EL1) having an average fiber diameter of 16 µm and a bulk density of 100 kg/m³.

[EL2]

A polyacrylonitrile resin (manufactured by Sigma-Aldrich Corporation) was dissolved in N,N-dimethylformamide to prepare a 10 mass % solution. Using an electrospinning apparatus, the thus obtained resin solution was spun at a voltage of 20 kV with a distance to the collector of 10 cm, thereby stacking polyacrylonitrile resin fibers at a weight of 0.75 g/m².

Subsequently, short fibers (length: about 10 mm) of a flame-resistant fiber obtained by subjecting the obtained polyacrylonitrile resin fibers to a flame resistance treatment in air at 200 to 300° C. were felted to prepare a non-woven fabric having a fabric weight of 300 g/m² and a thickness of 5.0 mm.

The non-woven fabric was heated in a nitrogen gas atmosphere to 1,000° C. at a rate of temperature increase of 100° C./minute, the atmosphere was then changed to an argon gas atmosphere and the temperature was increased to 1,800° C., and the non-woven fabric was then carbonized by holding that temperature for one hour, before being cooled. Subsequently, the carbonized non-woven fabric was subjected to a heat treatment at 600° C. for 20 minutes in a nitrogen gas atmosphere containing 7% of oxygen, thus obtaining a porous carbon material (EL2).

The thus obtained porous carbon material (EL2) had an average fiber diameter of 160 nm and a bulk density of 100 kg/m³.

[EL3]

With the exception of replacing the N,N-dimethylformamide solution of the polyacrylonitrile resin, and instead using a 10 mass % aqueous solution of a phenolic resin (BRL-120Z) manufactured by Showa Denko K.K., phenolic resin fibers were stacked to a weight of 0.75 g/m² in the same manner as EL2.

Using a heating furnace, the obtained phenolic resin fibers were subjected to a heat treatment in which the initial heating temperature was set to 60° C., and the temperature was increased in a continuous manner, to 65° C. over the first one hour, to 75° C. over the next one hour, to 95° C. over the subsequent one hour, and then to 150° C. over the final one hour, thereby obtaining insoluble and infusible phenolic resin fibers having an average fiber diameter of 18 µm.

The phenolic resin fibers obtained in this manner were cut into short fibers of about 60 mm and felted to prepare a non-woven fabric having a fabric weight of 300 g/m² and a thickness of 5.0 mm.

The non-woven fabric was heated in a nitrogen gas atmosphere to 1,000° C. at a rate of temperature increase of 100° C./minute, the atmosphere was then changed to an argon gas atmosphere and the temperature was increased to 1,800° C., and the non-woven fabric was then carbonized by holding that temperature for one hour, before being cooled. Subsequently, the carbonized non-woven fabric was subjected to a heat treatment at 600° C. for 20 minutes in a nitrogen gas atmosphere containing 7% of oxygen, thus obtaining a porous carbon material (EL3).

The thus obtained porous carbon material (EL3) had an average fiber diameter of 200 nm and a bulk density of 100 kg/m³.

[EL4]

With the exception of adding 0.01 mass % of boric acid to the N,N-dimethylformamide solution of the polyacrylonitrile resin, a non-woven fabric formed from flame-resistant polyacrylonitrile short fibers and having a fabric weight of 500 g/m² and a thickness of 5.0 mm was obtained in the same manner as EL2. This non-woven fabric was carbonized in the same manner as EL2 with the exception of increasing the temperature to 2,500° C. after the atmosphere was changed to an argon gas atmosphere. The carbonized non-woven fabric was cooled, and then subjected to a heat treatment at 600° C. for 20 minutes in a nitrogen gas atmosphere containing 7% of oxygen, thus obtaining a porous carbon material (EL4).

The thus obtained porous carbon material (EL4) had an average fiber diameter of 170 nm and a bulk density of 100 kg/m³. Further, the boron content of EL4 was 1.2 mass %.

[EL5]

Short fibers (length: about 70 mm) of a flame-resistant fiber obtained by subjecting a polyacrylonitrile resin fiber with an average fiber diameter of 16 µm to a flame resistance treatment in air at 200 to 300° C. were felted to prepare a non-woven fabric having a fabric weight of 5,000 g/m² and a thickness of 5.0 mm.

The non-woven fabric was heated in a nitrogen gas atmosphere to 1,000° C. at a rate of temperature increase of 100° C./minute, the atmosphere was then changed to an argon gas atmosphere and the temperature was increased to 1,800° C., and the non-woven fabric was then carbonized by holding that temperature for one hour, before being cooled. Subsequently, the carbonized non-woven fabric was subjected to a heat treatment at 600° C. for 20 minutes in a nitrogen gas atmosphere containing 7% of oxygen, thus obtaining a porous carbon material (EL5) having an average fiber diameter of 16 µm and a bulk density of 5,000 kg/m³.

[EL6]

Short fibers (length: about 70 mm) of a flame-resistant fiber obtained by subjecting a polyacrylonitrile resin fiber with an average fiber diameter of 7 µm to a flame resistance treatment in air at 200 to 300° C. were felted to prepare a non-woven fabric having a fabric weight of 45 g/m² and a thickness of 5.0 mm.

The non-woven fabric was carbonized, cooled and then heat treated in the same manner as EL1, yielding a porous carbon material (EL6) having an average fiber diameter of 7 µm and a bulk density of 440 kg/m³.

[EL7]

Short fibers (length: about 10 mm) of a flame-resistant polyacrylonitrile fiber obtained in the same manner as EL2 were felted to prepare a non-woven fabric having a fabric weight of 20 g/m² and a thickness of 200 μm.

The non-woven fabric was then carbonized and cooled in the same manner as EL2. Subsequently, the carbonized non-woven fabric was dipped in an aqueous PTFE dispersion, and after drying at 60° C., was subjected to a heat treatment at 360° C. for 60 minutes in a nitrogen gas atmosphere containing 7% of oxygen, thus obtaining a porous carbon material (EL7) that had undergone a water repellency treatment with a 5 mass % PTFE dispersion.

The thus obtained porous carbon material had an average fiber diameter of 200 nm and a bulk density of 100 kg/m³.

[EL8]

A product LEP-205 manufactured by Osaka Gas Chemicals Co., Ltd. was used. In this porous carbon material (EL8), the contact points between the carbon fibers are not carbonized, and the material is formed only through fiber entanglement. Further, this porous carbon material (EL8) had an average fiber diameter of 13 μm and a bulk density of 100 kg/m³.

The bulk density of each porous carbon material was measured using the method described below.

The porous carbon material was cut using a square-shaped punching blade with dimensions of 50×50 mm, thus preparing a test piece of 50×50 mm (tolerance: ±0.5). The thickness of the prepared test piece was measured at a constant pressure of 23.5 kPa, and the volume of the test piece was determined. Further, the mass of the obtained test piece was measured to an accuracy of 0.001 g. The mass of the test piece obtained from this measurement was divided by the volume of the test piece to calculate the bulk density.

Example 1

Using a unidirectional twin-screw extruder (KTX-30, manufactured by Kobe Steel, Ltd.), 100 parts by mass of the resin composition P01 and 600 parts by mass of the carbonaceous material C1 were compounded under an open-head state including a temperature setting of 210° C. and a rotational rate of 400 rpm, thus forming a mixture. Subsequently, the mixture was extrusion-molded at a temperature setting of 200° C. using a single screw sheet extruder, thereby forming a sheet-like first layer having a length of 200 mm, a width of 200 mm and a thickness of 1.5 mm (first molding step).

Further, 100 parts by mass of the resin composition P08, 300 parts by mass of the carbonaceous material C1 and 100 parts by mass of the carbonaceous material C4 were compounded to prepare a mixture and then extrusion molded in a similar manner to the first layer, thereby forming a sheet-like second layer having a length of 200 mm, a width of 200 mm and a thickness of 1.5 mm (second molding step). The thus obtained sheet-like second layer was then rolled to prepare a sheet-like second layer with a thickness of 0.1 mm.

Next, layers of the sheet-like second layer were disposed in contact with both surfaces of the sheet-like first layer, and the resulting structure was placed in a mold with dimensions of 100×100×1.5 mm, heated for 2 minutes at 230° C. while a surface pressure of 20 MPa was applied using a 50 t hot press, and then cooled to a temperature of 60° C. or lower while the surface pressure of 20 MPa was maintained. As a result, the second layers were welded to the first layer, forming a laminate having a length of 100 mm, a width of 100 mm and a thickness of 1.5 mm in which the first layer and the second layers contacting both surfaces of the first layer had been integrated into a single body.

Subsequently, the porous carbon material EL1 was disposed in contact with both surfaces of the laminate, the resulting structure was heated at 145° C. for 10 minutes while a surface pressure of 3 MPa was applied using a hot press, and the temperature was then cooled to 80° C. or lower. This welded the second layers to the third layers. The steps described above yielded a carbon member of Example 1.

Example 2

Using the same method as Example 1, a mixture for forming the first layer was produced, and by subsequently shaping and extruding the mixture through the die of a twin screw extruder, a sheet-like first layer having a length of 100 mm, a width of 100 mm and a thickness of 1.5 mm was molded.

Using the resin composition and the carbonaceous materials shown in Table 4, and in a similar manner to the first layer, a step of forming a mixture for the second layer and a step of molding the mixture into a sheet-like second layer with a length of 100 mm, a width of 100 mm and a thickness of 1.5 mm were performed in a continuous manner. Subsequently, the obtained sheet-like second layer was rolled to prepare a sheet-like second layer with a thickness of 0.1 mm.

With the exception of using the thus obtained sheet-like first layer and sheet-like second layer, the first layer, second layers and third layers were stacked in the same manner as Example 1 to obtain a carbon member of Example 2.

Example 3

Using the mixture for the first layer and the mixture for the second layer produced in Example 1, the first layer and the second layers were co-extruded at a temperature setting of 230° C., thereby disposing sheet-like second layers in contact with both surfaces of the sheet-like first layer, and forming a laminate having a length of 100 mm, a width of 100 mm and a thickness of 1.5 mm in which the first layer and the second layers had been integrated into a single body.

Subsequently, both surfaces of the obtained laminate in a similar manner to Example 1 were welded to the porous carbon material EU for forming the third layers, respectively, thus obtaining a carbon member of Example 3.

Examples 4 to 29

With the exception of using the resin compositions, the carbonaceous materials and the porous carbon materials shown in Table 4 to Table 8, carbon members of Examples 4 to 29 were obtained in the same manner as Example 1.

Reference Examples 1 and 2

With the exceptions of using the resin compositions, the carbonaceous materials and the porous carbon materials shown in Table 8, and not performing the welding operation, carbon members of Reference Examples 1 and 2 were obtained in the same manner as Example 1.

Comparative Example 1

A sheet-like first layer having a length of 100 mm, a width of 100 mm and a thickness of 1.5 mm was formed in the same manner as Example 1.

Next, a sheet piece having a length of 20 mm, a width of 20 mm and a thickness of 1.5 mm was cut from the sheet-like first layer.

A third layer shown in Table 9 having a length of 20 mm, a width of 20 mm and a thickness of 1.5 mm was then disposed on each surface of the sheet piece. These steps yielded a carbon member of Comparative Example 1.

Comparative Example 2

A mixture for forming the first layer and a mixture for forming the second layer produced in the same manner as Example 1 were each placed in a mold having a length of 100 mm, a width of 100 mm and a thickness of 1.3 mm, heated for 2 minutes at 230° C. while a surface pressure of 20 MPa was applied using a 50 t hot press, and then cooled to a temperature of 60° C. or lower while the surface pressure of 20 MPa was maintained, thereby molding a sheet-like first layer and second layer each having a length of 100 mm, a width of 100 mm and a thickness of 1.3 mm.

The sheet-like first layer, the sheet-like second layer, and the porous carbon material EL 1 for forming the third layer were each cut to a size having a length of 20 mm and a width of 20 mm, and were then stacked in a sequence represented by third layer/second layer/first layer/second layer/third layer. These steps yielded a carbon member of Comparative Example 2.

Comparative Examples 3 to 5

With the exception of using the resin compositions, carbonaceous materials and porous carbon materials shown in Table 9, carbon members of Comparative Examples 3 to 5 were obtained in the same manner as Example 1.

Comparative Example 6

With the exception of using the materials shown in Table 9, a laminate having second layers laminated to both surfaces of a first layer was formed in the same manner as Example 1.

Next, the porous carbon material EL1 for forming the third layers was disposed in contact with both surfaces of the laminate, the resulting structure was heated for 10 minutes at 170° C. while a surface pressure of 3 MPa was applied using a hot press, and the temperature was then cooled to 80° C. or less. This process welded the second layers to the third layers. The above steps yielded a carbon member of Comparative Example 6.

Comparative Example 7

With the exception of using the materials shown in Table 10, a carbon member of Comparative Example 7 was obtained in the same manner as Comparative Example 6.

Comparative Example 8

With the exception of using the materials shown in Table 10, a sheet-like first layer having a length of 100 mm, a width of 100 mm and a thickness of 1.5 mm was formed in the same manner as Comparative Example 1.

Next, the porous carbon material EL1 for forming the third layers was disposed in contact with both surfaces of the sheet-like first layer, the resulting structure was heated for 10 minutes at 170° C. while a surface pressure of 3 MPa was applied using a hot press, and the temperature was then cooled to 80° C. or lower. This process welded the third layers and the first layer. The above steps yielded a carbon member of Comparative Example 8.

Comparative Example 9

With the exception of using the materials shown in Table 10, a mixture for forming the first layer was obtained in the same manner as Example 1. Subsequently, using a single screw sheet extruder, extrusion molding of the mixture at a temperature setting of 200° C. was attempted, but because the amount of the carbonaceous material within the mixture was very large, the pressure increased excessively, and the mixture could not be extruded.

Accordingly, the mixture for forming the first layer was placed in a mold having a length of 100 mm, a width of 100 mm and a thickness of 1.5 mm, heated for 2 minutes at 230° C. while a surface pressure of 20 MPa was applied using a 50 t hot press, and then cooled to a temperature of 60° C. or lower while the surface pressure of 20 MPa was maintained, thereby molding a sheet-like first layer having a length of 100 mm, a width of 100 mm and a thickness of 1.5 mm.

Further, with the exception of using the materials shown in Table 10, a mixture for forming the second layer was obtained in the same manner as Example 1. A sheet-like second layer having a length of 200 mm, a width of 200 mm and a thickness of 1.5 mm was then formed in the same manner as Example 1 (second molding step). The thus obtained sheet-like second layer was then rolled to prepare a sheet-like second layer with a thickness of 0.1 mm.

Subsequently, pieces of the sheet-like second layer were disposed in contact with both surfaces of the sheet-like first layer, and a laminate having a length of 100 mm, a width of 100 mm and a thickness of 1.5 mm was obtained in the same manner as Example 1.

Next, the third layers shown in Table 10 were disposed in contact with both surfaces of the laminate, and the second layers were then welded to the third layers in the same manner as Example 1. These steps yielded a carbon member of Comparative Example 9. In Comparative Example 9, the second layers and the third layers were unable to be welded together.

Comparative Example 10

With the exception of using the materials shown in Table 10, a mixture for forming the first layer was obtained in the same manner as Example 1. Subsequently, a sheet-like first layer having a length of 200 mm, a width of 200 mm and a thickness of 1.5 mm was formed in the same manner as Example 1.

With the exception of using the materials shown in Table 10, a mixture for forming the second layer was obtained in the same manner as Example 1. Subsequently, using a single screw sheet extruder, extrusion molding of the mixture at a temperature setting of 200° C. was attempted, but because the amount of the carbonaceous material within the mixture was very large, the pressure increased excessively, and the mixture could not be extruded.

Accordingly, the mixture for forming the second layer was placed in a mold having a length of 100 mm, a width of 100 mm and a thickness of 1.5 mm, heated for 2 minutes at 230° C. while a surface pressure of 20 MPa was applied using a 50 t hot press, and then cooled to a temperature of 60° C. or lower while the surface pressure of 20 MPa was maintained, thereby molding a sheet-like second layer having a length of 100 mm, a width of 100 mm and a thickness of 1.5 mm.

Subsequently, pieces of the sheet-like second layer were disposed in contact with both surfaces of the sheet-like first layer, and a laminate having a length of 100 mm, a width of 100 mm and a thickness of 1 5 mm was obtained in the same manner as Example 1.

Next, the porous carbon material EL3 for forming the third layers was disposed in contact with both surfaces of the laminate, and an attempt was made to weld the second layers to the third layers in the same manner as Example 1, but in the case of the carbon member of Comparative Example 10, the second layers and the third layers were unable to be welded together.

The carbon members of Examples 1 to 29, Reference Examples 1 and 2, and Comparative Examples 1 to 10 obtained using the methods described above were each evaluated for penetration resistance, flexural properties and weldability using the methods described below. The results are shown in Table 4 to Table 10.

(Penetration Resistance)

Figure 4:
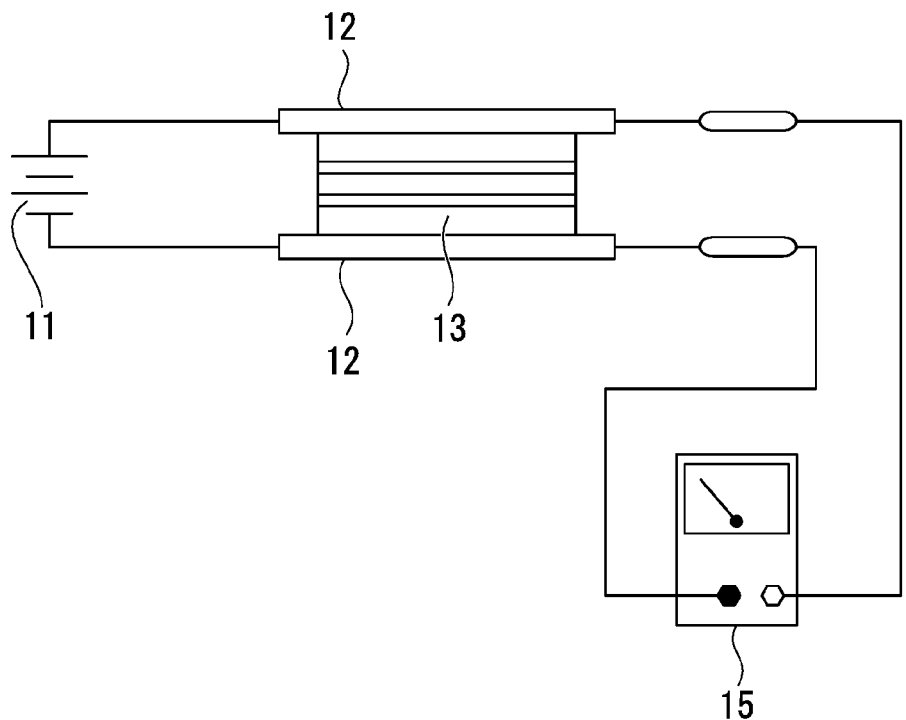
FIG. 4 is a diagram for describing a method for measuring penetration resistance.

FIG. 4 is a diagram for describing a method for measuring penetration resistance. In FIG. 4, numeral 11 indicates a constant current power supply, numeral 12 indicates a CIP material, numeral 13 indicates a test piece of a carbon member, and numeral 15 indicates a voltmeter.

In order to measure the penetration resistance of a carbon member, a test piece 13 having a length of 20 mm and a width of 20 mm was cut from the carbon member. Next, as illustrated in FIG. 4, the test piece 13 was sandwiched and compressed between two CIP materials 12 (IGS-744, manufactured by Nippon Techno-Carbon Co., Ltd.) each having a length of 30 mm, a width of 30 mm and a thickness of 2 mm, so that the thickness of the third layers disposed on the outermost layers of the test piece 13 was adjusted to 3 mm. Subsequently, a constant current (1 A) was passed through the test piece 13 using the constant current power supply 11, the voltage between the two CIP materials 12 was measured using the voltmeter 15, and the penetration resistance was calculated using the formula shown below.

Penetration resistance=voltage×surface area (4 cm$^2$)/current (mΩcm$^2$)

(Flexural Properties)

The flexural strength and the flexural strain were measured as the flexural properties. The flexural strength and the flexural strain were measured using an Autograph (AG-10kNI) manufactured by Shimadzu Corporation. Specifically, a test piece having a length of 80 mm, a width of 10 mm and a thickness of 4 mm was prepared, and was then measured in accordance with the method of JIS K6911, using a three-point flexural strength measurement method under conditions including a span of 64 mm and a flexural speed of 1 mm/min.

(Weldability)

The weldability was evaluated using a Strograph manufactured by Toyo Seiki Seisaku-sho, Ltd., by peeling the third layer of the carbon member at a speed of 10 mm/min. Carbon members which suffered cohesive failure were evaluated using the symbol ○, carbon members for which interface peeling occurred were evaluated using the symbol Δ, and carbon members for which welding did not occur (and the layers had not welded together) were evaluated using the symbol ×.

As illustrated in Table 4 to Table 10, the carbon members of Examples 1 to 29 each had a high flexural strength of at least 44 MPa, excellent conductivity with a penetration resistance of not more than 41 mΩcm$^2$, and a weldability evaluation of O.

Further, in Example 2, the step of forming the mixture for the first layer and the step of molding the sheet-like first layer were performed in a continuous manner. Further, in Example 2, the step of forming the mixture for the second layer and the step of molding the sheet-like second layers were performed in a continuous manner. As a result, the carbon member of Example 2 was able to be produced easily and efficiently.

Furthermore, in Example 3, the first layer and the second layers were co-extruded to form a laminate in which the first layer and the second layers were integrated into a single body. As a result, the carbon member of Example 3 was able to be produced easily and efficiently.

In Examples 6 to 9, Example 12, Example 21, Example 22, Example 26 and Example 27, each of which contained the carbon fiber C5 as the carbonaceous material, the penetration resistance was 25 mΩcm$^2$ or less, indicating extremely superior conductivity.

Further, in Example 12, Example 26 and Example 27, in which EL4 containing boron was used as the porous carbon material, the penetration resistance was 15 mΩcm$^2$ or less, indicating extremely superior conductivity.

In Reference Example 1 and Reference Example 2, a welding operation was not performed, and therefore as shown in Table 8, the penetration resistance was an extremely high value.

In Comparative Example 1 and Comparative Example 2, a welding operation was not performed, and therefore as shown in Table 9, the penetration resistance was an extremely high value.

Further, because Comparative Example 3 used a high-molecular weight binder having a low MFR as the resin composition for forming the second layer, the weldability was unsatisfactory, and the third layers of the carbon member peeled easily. Furthermore, in Comparative Example 3, because the weldability was unsatisfactory, the penetration resistance was high.

Comparative Example 4 used a low-molecular weight binder having a high MFR as the resin composition for forming the first layer, and therefore the flexural strength was poor and the carbon member was prone to cracking.

In Comparative Example 5, the melting point of the second layer was higher than that of the first layer, a low-molecular weight binder having a high MFR was used as the resin composition for forming the first layer, and a high-molecular weight binder having a low MFR was used as the resin composition for forming the second layer. As a result, the carbon member of Comparative Example 5 displayed poor weldability, had a high penetration resistance, and exhibited low flexural strength.

In Comparative Example 6, the difference in the melting points of the first layer and the second layer was small, and therefore the weldability was poor and the penetration resistance was high.

In Comparative Example 7, the melting point of the second layer was higher than that of the first layer, and therefore the weldability was poor and the penetration resistance was high.

Comparative Example 8 lacked a second layer, and therefore the first layer and the third layers could not be welded together, and the penetration resistance was high.

In Comparative Example 9, because the amount of the carbonaceous material in the first layer was too large, the first layer could not be extrusion molded. As a result, the productivity was poor. Further, in Comparative Example 9, because the amount of the carbonaceous material in the first layer was too large, the flexural strength was poor.

In Comparative Example 10, because the amount of the carbonaceous material in the second layer was too large, the second layer could not be extrusion molded. As a result, the productivity was poor. Further, in Comparative Example 10, because the amount of the carbonaceous material in the second layer was too large, the second layers and the third layers could not be welded together. Moreover, because the second layers and the third layers could not be welded together, the penetration resistance was high.

<Redox Flow Examples>

Example 30

A redox flow battery illustrated in FIG. 5 was formed, and the electrode pressure loss and the internal resistance were determined and evaluated using the methods described below.

Figure 5:
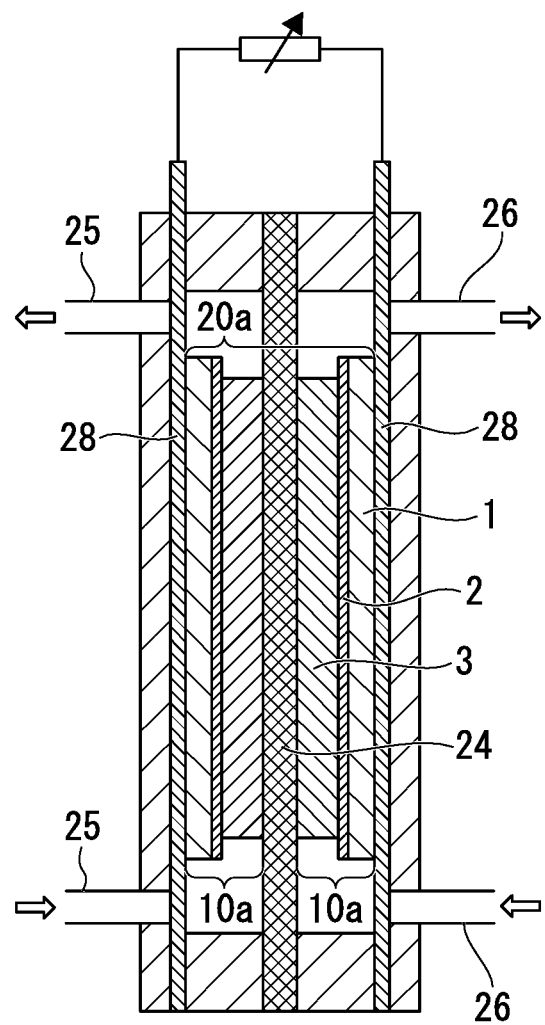
FIG. 5 is an explanatory diagram for describing a redox flow battery that is evaluated in the examples.

The redox flow battery illustrated in FIG. 5 includes a cell 20a having a carbon member 10a, formed from a third layer 3, a second layer 2 and a first layer 1 in that order, disposed on each side of a diaphragm 24, with the third layer 3 positioned closest to the diaphragm 24. The cell 20a is disposed between copper plates 28. The third layer 3 of one of the two carbon members 10a functions as the positive electrode, and the other third layer 3 functions as the negative electrode. Further, each of the first layers 1 functions as a bipolar plate main body, and each of the second layers 2 functions as a bipolar plate surface layer.

In Example 30, with the exception of altering the size of the porous carbon material of the third layer to 1×10 cm, carbon members prepared in a similar manner to that of Example 1 were used to form the redox flow battery illustrated in FIG. 5, and a charge-discharge evaluation was then performed at 60 mA/cm².

A positive electrode electrolyte was supplied to the interior of the positive electrode through a positive electrode line 25, and a negative electrode electrolyte was supplied to the interior of the negative electrode through a negative electrode line 26. The electrolyte used as the positive electrode electrolyte and the negative electrode electrolyte had a total vanadium concentration of 2 mol/l and a total sulfate group concentration of 4 mol/l.

Further, the surface area of the third layer was 10 cm², and a Nafion membrane (product name: N115, manufactured by DuPont Corporation) was used as the diaphragm. Further, when assembling the cell, compression was performed so that the porous carbon material having a thickness of 5.0 mm used as the third layer was compressed to a thickness of 4.0 mm.

Further, the electrode pressure loss was determined from the difference in pressure between the inlet and the outlet for the negative electrode electrolyte. The internal resistance R was determined from the formula shown below, wherein VM represents the no-load voltage, VC represents the terminal voltage on load, and I represents the current.

$$R=|(VM-VC)/I|$$

Example 31

With the exception of altering the size of the porous carbon material of the third layer to 1×10 cm, carbon members prepared in a similar manner to that of Example 8 were used to form the redox flow battery illustrated in FIG. 5, and a charge-discharge evaluation was then performed in the same manner as Example 30.

Comparative Example 11

With the exception of not welding the second layer and the third layer, a cell was assembled and a redox flow battery was formed in a similar manner to Example 30, and a charge-discharge evaluation was then performed.

Reference Example 3

With the exception of replacing the porous carbon material of the third layer from Comparative Example 11 with EL5 (the configuration of Reference Example 1), a redox flow battery was formed in the same manner as Comparative Example 11, and a charge-discharge evaluation was then performed.

Reference Example 4

With the exception of replacing the porous carbon material of the third layer from Comparative Example 11 with EL6 (the configuration of Reference Example 2), a redox flow battery was formed in the same manner as Comparative Example 11, and a charge-discharge evaluation was then performed.

TABLE 11

| | | | Example 30 | | | Example 31 | | | Comparative Example 11 | | |
|---|---|---|---|---|---|---|---|---|---|---|---|
| | <Resin composition> | | first | second | third | first | second | third | first | second | third |
| Type | MFR [g/10 min] | Melting point [° C.] | layer [parts by mass] | layer | layer | layer [parts by mass] | layer | layer | layer [parts by mass] | layer | layer |
| P01 | 0.5 | 162 | 100 | | 100 | | | 100 | | | |
| P08 | 820 | 127 | | 100 | | | | | | 100 | |
| P10 | 84 | 132 | | | | | 100 | | | | |
| | <Carbonaceous material> | | | | | | | | | | |
| C1 | Boron-containing fine graphite powder (boron content: 1.9 mass %) [parts by mass] | | 600 | 300 | | 600 | 300 | | 600 | 300 | |
| C4 | Gas phase method carbon fiber (average fiber diameter: 0.15 µm) [parts by mass] | | | | 100 | | | 50 | | | 100 |

TABLE 11-continued

| | | | | | | | | |
|---|---|---|---|---|---|---|---|---|
| C5 | Gas phase method carbon fiber (average fiber diameter: 0.015 μm) [parts by mass] | | | | | 50 | | |
| | Carbon fiber content [mass %] | 0 | 25 | 0 | 25 | 0 | 25 | |
| | <Molding method> | | | | | | | |
| | Preliminary mixing | yes | yes | yes | yes | yes | yes | |
| | Sheet molding | extrusion | extrusion | extrusion | extrusion | extrusion | extrusion | |

<Third layer: porous carbon material>

| Type | Average fiber diameter [μm] | Bulk density [kg/m³] | | | | | | |
|---|---|---|---|---|---|---|---|---|
| EL1 | 16 | 100 | ○ | | | | | ○ |
| EL2 | 0.16 | 100 | | | ○ | | | |
| EL5 | 16 | 5000 | | | | | | |
| EL6 | 7 | 440 | | | | | | |
| | Welding operation | | yes | | yes | | no | |
| | Internal resistance [Ω·cm²] | | 0.97 | | 0.84 | | 1.14 | |
| | Pressure loss [kg/cm²] | | 0.11 | | 0.065 | | 0.12 | |

| | | | | Reference Example 3 | | | Reference Example 4 | | |
|---|---|---|---|---|---|---|---|---|---|
| | <Resin composition> | | | first | second | third | first | second | third |
| | Type | MFR [g/10 min] | Melting point [° C.] | layer [parts by mass] | layer | layer | layer [parts by mass] | layer | layer |
| | P01 | 0.5 | 162 | 100 | | | 100 | | |
| | P08 | 820 | 127 | | 100 | | | 100 | |
| | P10 | 84 | 132 | | | | | | |
| | <Carbonaceous material> | | | | | | | | |
| C1 | Boron-containing fine graphite powder (boron content: 1.9 mass %) [parts by mass] | | | 600 | 300 | | 600 | 300 | |
| C4 | Gas phase method carbon fiber (average fiber diameter: 0.15 μm) [parts by mass] | | | | | 100 | | | 100 |
| C5 | Gas phase method carbon fiber (average fiber diameter: 0.015 μm) [parts by mass] | | | | | | | | |
| | Carbon fiber content [mass %] | | | 0 | 25 | | 0 | 25 | |
| | <Molding method> | | | | | | | | |
| | Preliminary mixing | | | yes | yes | | yes | yes | |
| | Sheet molding | | | extrusion | extrusion | | extrusion | extrusion | |

<Third layer: porous carbon material>

| Type | Average fiber diameter [μm] | Bulk density [kg/m³] | | | | |
|---|---|---|---|---|---|---|
| EL1 | 16 | 100 | | | | |
| EL2 | 0.16 | 100 | | | | |
| EL5 | 16 | 5000 | | ○ | | |
| EL6 | 7 | 440 | | | | ○ |
| | Welding operation | | | no | | no |
| | Internal resistance [Ω·cm²] | | | 1.02 | | 1.76 |
| | Pressure loss [kg/cm²] | | | 1.3 | | 0.023 |

The results for the electrode pressure loss and the internal resistance are shown in Table 11.

In Example 30, because the first layer through to the third layer were integrated into a single body by welding, the internal resistance was a lower value than that observed for Comparative Example 11. Further, in Example 31, because EL2 having an average fiber diameter of 0.16 μm was used as the porous carbon material of the third layer, the internal resistance was even lower, and the pressure loss was also smaller.

On the other hand, based on the results for Reference Example 3, it is evident that if the bulk density of the porous carbon material used for the third layer is too large, then the flow of the electrolyte is inhibited, and the pressure loss increases. Further, based on the results for Reference Example 4, it is evident that if the bulk density of the porous carbon material used for the third layer is too low, then the internal resistance increases.

<Fuel Cell Examples>

Example 32

A fuel cell evaluation cell illustrated in FIG. 6 was formed, and the power generation characteristics of the evaluation cell were then evaluated using the method described below.

Figure 6:
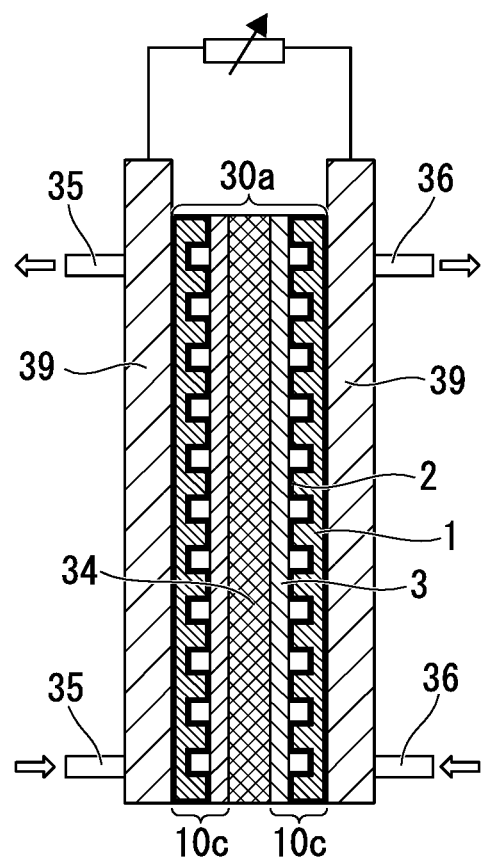
FIG. 6 is an explanatory diagram for describing an evaluation cell for a fuel cell, which is evaluated in the examples.

In the fuel cell evaluation cell illustrated in FIG. 6, all the structural members other than the carbon member 10c were the same as those described for the Japan Automobile Research Institute (JARI) evaluation cell.

The fuel cell evaluation cell illustrated in FIG. 6 includes a unit cell 30a having a carbon member 10c, formed from a third layer 3, a second layer 2 and a first layer 1 in that order, disposed on each side of an MEA 34, with the third layer 3 positioned closest to the MEA 34. The unit cell 30a is disposed between current collectors 39. The third layer 3 of one of the two carbon members 10c functions as a first gas diffusion layer, and the other third layer 3 functions as a second gas diffusion layer. Further, each of the first layers 1 functions as a separator main body, and each of the second layers 2 functions as a separator surface layer.

In Example 32, a unit cell produced using the method described below was used. In other words, two sheet-like first layers prepared in the same manner as Example 1 were stacked together, sheet-like second layers that had also been prepared in the same manner as Example 1 were used to sandwich the first layers from both sides, the resulting structure was placed in a mold heated to 230° C. that was capable of molding the same channels as those of a JARI evaluation cell, and following preheating for 5 minutes, a pressure of 25 MPa was applied with a compression molding machine and maintained for 2 minutes. Subsequently, by cooling the mold temperature to 50° C. at a pressure of 25 MPa using a cooling press, a separator having a thickness of 3 mm was molded in which the surface had been coated with the resin composition of the second layer, and channels (width 1 mm×ridge width: 1 mm×depth 1 mm) similar to those of a JARI evaluation cell had been formed in one surface.

Next, a structure prepared by disposing a third layer on each surface of the MEA was sandwiched between two separators so that the surfaces of the separators in which the channels had been formed were positioned facing the third layers, the resulting structure was then heated for 10 minutes at 145° C. while a surface pressure of 2 MPa was applied using a hot press, and the structure was then cooled to a temperature of 60° C. or lower.

As a result, the second layers were welded to the third layers to produce a unit cell, and this cell was used to form an evaluation cell.

In Example 32, as shown in Table 12, a gas diffusion electrode (hereafter abbreviated as GDL) manufactured by SGL Group (product name: SIGRACET (a registered trademark), a 5 wt % PTFE water repellency-treated substrate with a standard microporous layer (MPL) (substrate thickness: 200 μm, average fiber diameter: 8 μm, bulk density: 250 kg/m$^3$)) was used as the third layer.

Further, a standard MEA for an FC25-MEA PEFC (25 cm$^2$) (amount of catalyst: 1 mg/cm$^2$ Pt, 20 wt % Pt/C catalyst (manufactured by Toyo Corporation) was used as the MEA.

TABLE 12

| | | | Example 32 | | | Example 33 | | | Comparative Example 12 | | |
|---|---|---|---|---|---|---|---|---|---|---|---|
| | <Resin composition> | | first layer | second layer | third layer | first layer | second layer | third layer | first layer | second layer | third layer |
| Type | MFR [g/10 min] | Melting point [° C.] | [parts by mass] | | | [parts by mass] | | | [parts by mass] | | |
| P01 | 0.5 | 162 | 100 | | | 100 | | | 100 | | |
| P02 | 1.2 | 157 | | | | | | | | | |
| P04 | 1.9 | 158 | | | | | | | | | |
| P05 | 30 | 136 | | | | | | | | | |
| P07 | 30 | 138 | | | | | | | | | |
| P08 | 820 | 127 | | 100 | | | 100 | | | | |
| P09 | 168 | 134 | | | | | | | | | |
| P10 | 84 | 132 | | | | | | | | | |
| | <Carbonaceous material> | | | | | | | | | | |
| C1 | Boron-containing fine graphite powder | | 600 | 300 | | 600 | 300 | | 600 | | |
| C2 | Synthetic fine graphite powder | | | | | | | | | | |
| C3 | Natural fine graphite powder | | | | | | | | | | |
| C4 | Gas phase method carbon fiber | | | 100 | | | 100 | | | | |
| C5 | Gas phase method carbon fiber | | | | | | | | | | |
| | Carbon fiber content [mass %] | | 0 | 25 | | 0 | 25 | | 0 | | |
| | <Molding method> | | | | | | | | | | |
| | Preliminary mixing | | yes | yes | | yes | yes | | yes | | |
| | Sheet molding | | extrusion | extrusion | | extrusion | extrusion | | extrusion | | |
| <Third layer: porous carbon material> | | | | | | | | | | | |
| Type | Average fiber diameter [μm] | Bulk density [kg/m$^3$] | | | | | | | | | |
| SIGRACET | 8 | 250 | | | ○ | | | ○ | | | |
| EL7 | 0.2 | 100 | | | | | | | | | ○ |
| | Welding operation | | | yes | | | yes | | | yes | |
| | Weldability | | | ○ | | | ○ | | | X | |

Example 33

As shown in Table 12, with the exception of using EL7 as the third layer instead of the GDL manufactured by SGL Group, an evaluation cell was prepared in the same manner as Example 32.

Comparative Example 12

As shown in Table 12, with the exception of using a separator having a thickness of 3 mm formed only from the first layer, namely a separator prepared without using any sheet-like second layers by simply placing two of the sheet-like first layers in the mold, an attempt was made to weld the separator (the first layer) to the third layer formed from the GDL in a similar manner to Example 32, but the first layer and the third layer were unable to be welded under these conditions.

As a result, the third layer was simply stacked on the separator to form a unit cell, and this unit cell was used to form an evaluation cell.

For each of the evaluation cells obtained in Examples 32 and 33 and Comparative Example 12, the relationship between the voltage and the current density when the cell was clamped so as to generate a surface pressure of 0.8 MPa or 0.3 MPa was investigated as an indication of the power generation characteristics. The results are shown in FIG. 7 and FIG. 8.

When investigating the power generation characteristics, hydrogen was supplied at a constant flow rate of 500 ml/min through a line 35 and into the interior of the first gas diffusion layer of the evaluation cell illustrated in FIG. 6, air was supplied at a constant flow rate of 2,080 ml/min through a line 36 and into the interior of the second gas diffusion layer, and the outlets of the line 35 and the line 36 were opened to the atmosphere. Further, a rubber heater was affixed to the evaluation cell to enable temperature regulation, and the cell temperature was set to 80° C., the anode dew point was set to 80° C. and the cathode dew point was set to 70° C.

Figure 7:
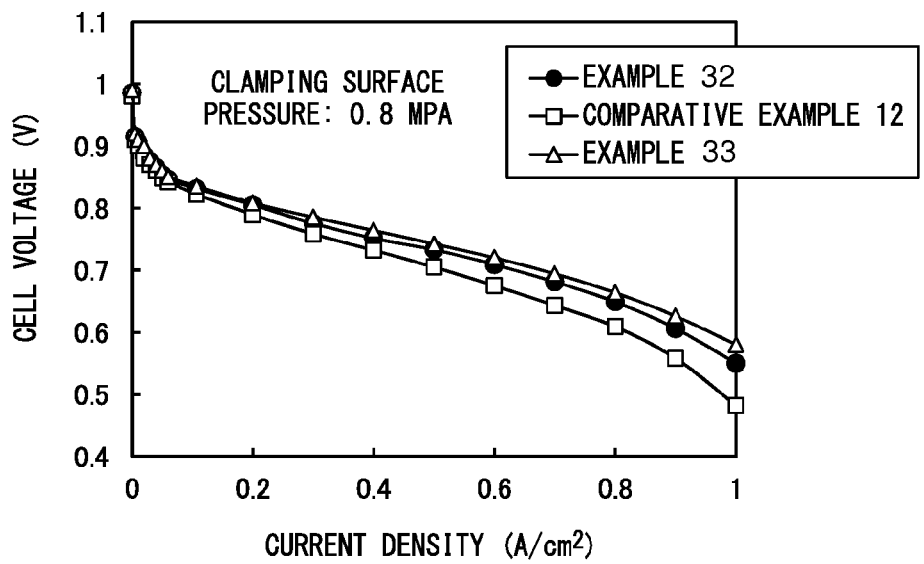
FIG. 7 is a graph illustrating the relationship between the voltage and the current density when the clamping surface pressure is 0.8 MPa [in Examples 32, 33 and Comparative example 12].
Figure 8:
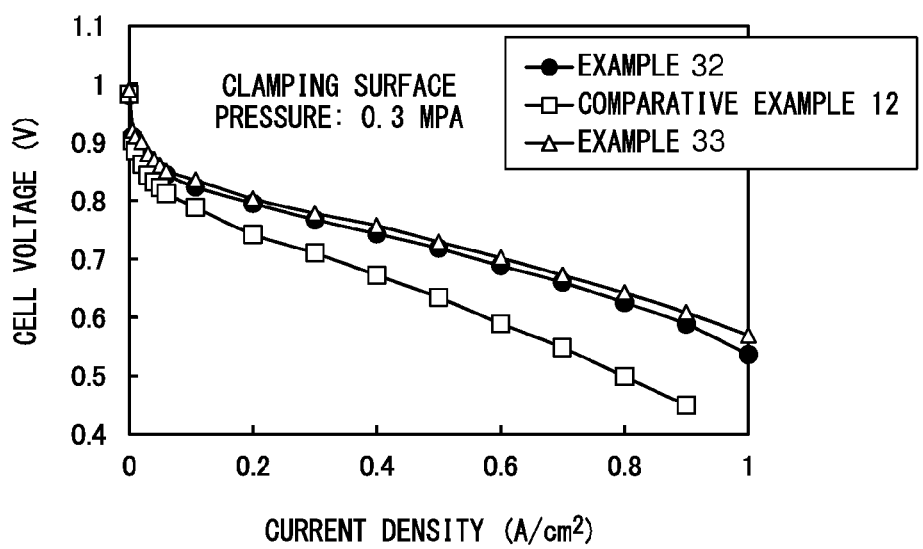
FIG. 8 is a graph illustrating the relationship between the voltage and the current density when the clamping surface pressure is 0.3 MPa [in Examples 32, 33 and Comparative example 12].

Based on FIG. 7 and FIG. 8 it is clear that in Examples 32 and 33, by welding the second layer to the third layer, a higher voltage and superior power generation characteristics were able to be achieved compared with Comparative Example 12. Further, it is also evident that in Example 33, because EL7 having an average fiber diameter of 200 nm was used as the porous carbon material of the third layer, particularly superior power generation characteristics were able to be achieved.

Furthermore, in Examples 32 and 33, because the first layer, the second layer and the third layer were welded together into a single integrated body, excellent power generation characteristics were able to be obtained regardless of the clamping surface pressure. In contrast, in Comparative Example 12, when the cell clamping surface pressure was 0.3 MPa as shown in FIG. 8, the power generation characteristics were inferior to those observed in FIG. 7 when the surface pressure was 0.8 MPa.

EXPLANATION OF REFERENCES

1: First layer
2: Second layer
3: Third layer
10: Carbon member
11: Constant current power supply
12: CIP material
13: Test piece
15: Voltmeter
20: Redox flow battery
20a: Cell
21: Bipolar plate main body
22: Bipolar plate surface layer
23: Electrode
23a: Positive electrode
23b: Negative electrode
24: Diaphragm
25: Positive electrode line
26: Negative electrode line
27: Bipolar plate
28: Copper plate
30: Fuel cell
30a: Unit cell
31: Separator main body
32: Separator surface layer
33a: First gas diffusion layer
33b: Second gas diffusion layer
34: MEA
37: Separator
38a: First gas passage
38b: Second gas passage
39: Current collector

What is claimed is:

1. A carbon member obtained by welding, into a single integrated body:
    a first layer comprising 100 parts by mass of a first resin composition containing a polyolefin-based resin and having a melt flow rate, measured at 230° C. with a load of 2.16 kg, of 0.01 to 10 g/10 min, and 100 to 1,000 parts by mass of a first carbonaceous material;
    a second layer, which is disposed in contact with at least one main surface of the first layer, and comprises 100 parts by mass of a second resin composition containing a polyolefin-based resin, having a said melt flow rate of 5 to 1,000 g/10 min that is greater than that of the first resin composition, and having a melting point that is 80° C. or higher, but is at least 10° C. lower than that of the first resin composition, and 100 to 1,000 parts by mass of a second carbonaceous material; and
    a third layer, which is disposed facing the first layer with the second layer interposed therebetween, and is formed from a porous carbon material having a bulk density of 60 to 800 kg/m$^3$.

2. The carbon member according to claim 1, wherein the first carbonaceous material and/or the second carbonaceous material comprises 1 to 50 mass % of carbon fiber having an average fiber diameter of 0.01 to 0.3 μm.

3. The carbon member according to claim 1, wherein the porous carbon material is formed from carbon fiber having an average fiber diameter of 0.01 to 0.3 μm.

4. The carbon member according to claim 1, wherein the first carbonaceous material and/or the second carbonaceous material comprises 0.01 to 4 mass % of boron.

5. The carbon member according to claim 1, wherein the first resin composition comprises 10 to 99 mass % of a polypropylene resin, and 1 to 40 mass % of a styrene-based thermoplastic elastomer.

6. The carbon member according to claim 1, wherein the second resin composition comprises 10 to 100 mass % of at least one α-olefin polymer selected from the group consisting of:
    (a) propylene-ethylene copolymers obtained by copolymerizing an ethylene unit with a propylene unit that functions as a main monomer unit,
    (b) ethylene-based copolymers obtained by copolymerizing an α-olefin unit having a carbon number of 3 to 10 with an ethylene unit that functions as a main monomer unit, and (c) polybutene-based resins obtained by copolymerizing an α-olefin having a carbon number of 2 to 10 (but excluding 1-butene) with a 1-butene unit that functions as a main monomer unit.

7. The carbon member according to claim 1, wherein the second resin composition comprises 2 to 40 mass % of an atactic polypropylene, 1 to 30 mass % of a tackifier resin, and 0.5 to 40 mass % of a styrene-based thermoplastic elastomer.

8. The carbon member according to claim 1, wherein the porous carbon material is a non-woven fabric formed from carbon fibers, and at least a portion of contact portions between the carbon fibers are carbonized, causing welding of the carbon fibers.

9. A carbon member manufacturing method comprising:
a step of performing co-extrusion molding of:
   a first layer which comprises 100 parts by mass of a first resin composition containing a polyolefin-based resin and having a melt flow rate, measured at 230° C. with a load of 2.16 kg, of 0.01 to 10 g/10 min, and 100 to 1,000 parts by mass of a first carbonaceous material, and
   a second layer which comprises 100 parts by mass of a second resin composition containing a polyolefin-based resin, having a said melt flow rate of 5 to 1,000 g/10 min that is greater than that of the first resin composition, and having a melting point that is 80° C. or higher, but is at least 10° C. lower than that of the first resin composition, and 100 to 1,000 parts by mass of a second carbonaceous material,
   thereby forming a laminate in which the second layer is disposed in contact with at least one main surface of the first layer, and the first layer and the second layer are integrated into a single body; and
a step of disposing a third layer, formed from a porous carbon material having a bulk density of 60 to 800 kg/m³, facing the first layer of the laminate with the second layer interposed therebetween, and welding the second layer to the third layer at a temperature that is at least as high as a melting point of the second layer.

10. A carbon member manufacturing method comprising:
a first molding step of performing extrusion molding of a first layer which comprises 100 parts by mass of a first resin composition containing a polyolefin-based resin and having a melt flow rate, measured at 230° C. with a load of 2.16 kg, of 0.01 to 10 g/10 min, and 100 to 1,000 parts by mass of a first carbonaceous material;
a second molding step of performing extrusion molding of a second layer which comprises 100 parts by mass of a second resin composition containing a polyolefin-based resin, having a said melt flow rate of 5 to 1,000 g/10 min that is greater than that of the first resin composition, and having a melting point that is 80° C. or higher, but is at least 10° C. lower than that of the first resin composition, and 100 to 1,000 parts by mass of a second carbonaceous material;
a step of disposing the second layer in contact with at least one main surface of the first layer, and welding the second layer to the first layer at a temperature that is at least as high as melting points of the first layer and the second layer, thereby forming a laminate in which the first layer and the second layer are integrated into a single body; and
a step of disposing a third layer, formed from a porous carbon material having a bulk density of 60 to 800 kg/m³, facing the first layer of the laminate with the second layer interposed therebetween, and welding the second layer to the third layer at a temperature that is at least as high as a melting point of the second layer.

11. The carbon member manufacturing method according to claim 10, wherein
in the first molding step, a step of supplying the first resin composition and the first carbonaceous material to an inlet of a twin screw extruder and performing mixing to obtain a first mixture, and a step of shaping and extruding the first mixture through a die of the twin screw extruder to mold a sheet-like first layer are performed continuously.

12. The carbon member manufacturing method according to claim 10, wherein
in the second molding step, a step of supplying the second resin composition and the second carbonaceous material to an inlet of a twin screw extruder and performing mixing to obtain a second mixture, and a step of shaping and extruding the second mixture through a die of the twin screw extruder to mold a sheet-like second layer are performed continuously.

13. A redox flow battery having a cell comprising an electrode and a bipolar plate disposed on each side of a diaphragm, wherein
the carbon member according to claim 1 is disposed on one side or both sides of the diaphragm as a battery member that integrates the electrode and the bipolar plate into a single body.

14. A fuel cell comprising a plurality of unit cells, each containing a fuel electrode and a first gas diffusion layer disposed on one surface of an electrolyte membrane and an air electrode and a second gas diffusion layer disposed on another surface of the electrolyte membrane, stacked with a separator interposed between the first gas diffusion layer and the second gas diffusion layer, wherein
the carbon member according to claim 1 is provided as a battery member that integrates the separator, and the first gas diffusion layer and/or the second gas diffusion layer positioned adjacent to the separator, into a single body.

* * * * *